(12) United States Patent
Kobayashi

(10) Patent No.: US 10,694,130 B2
(45) Date of Patent: Jun. 23, 2020

(54) IMAGING ELEMENT AND IMAGING DEVICE

(71) Applicant: FUJIFILM Corporation, Tokyo (JP)

(72) Inventor: Makoto Kobayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 34 days.

(21) Appl. No.: 16/202,109

(22) Filed: Nov. 28, 2018

(65) Prior Publication Data
US 2019/0098240 A1 Mar. 28, 2019

Related U.S. Application Data

(63) Continuation of application No. PCT/JP2017/016820, filed on Apr. 27, 2017.

(30) Foreign Application Priority Data

Jun. 1, 2016 (JP) .................................. 2016-110393

(51) Int. Cl.
*H04N 5/369* (2011.01)
*G02B 7/34* (2006.01)
(Continued)

(52) U.S. Cl.
CPC ........... *H04N 5/36961* (2018.08); *G02B 7/34* (2013.01); *G03B 13/36* (2013.01);
(Continued)

(58) Field of Classification Search
CPC ........... H04N 5/36961; H04N 9/04557; H04N 5/232122; H04N 9/64; G03B 13/36; G02B 7/34

See application file for complete search history.

(56) References Cited

U.S. PATENT DOCUMENTS

| | | | |
|---|---|---|---|
| 8,218,962 B2 * | 7/2012 | Fujii | G03B 13/32 348/222.1 |
| 8,531,583 B2 * | 9/2013 | Kimijima | G02B 7/34 348/345 |

(Continued)

FOREIGN PATENT DOCUMENTS

| | | |
|---|---|---|
| JP | 2008177903 | 7/2008 |
| JP | 2009159226 | 7/2009 |

(Continued)

OTHER PUBLICATIONS

"International Search Report (Form PCT/ISA/210) of PCT/JP2017/016820", dated Aug. 1, 2017, with English translation thereof, pp. 1-5.

(Continued)

*Primary Examiner* — Padma Haliyur
(74) *Attorney, Agent, or Firm* — JCIPRNET

(57) ABSTRACT

An imaging element has plural pixels which photoelectrically convert light rays having different colors, and has a light receiving surface on which the plural pixels are arranged in two dimensions according to a regular pattern, the plural pixels include first pixels that output signals each having a first color component which most contribute to obtainment of brightness signals, and second pixels that output signals having color components other than the first color component, the first pixels and the second pixels are as defined herein, and a pair row is formed on the light receiving surface as defined herein.

19 Claims, 12 Drawing Sheets

(51) Int. Cl.
*G03B 13/36* (2006.01)
*H04N 9/64* (2006.01)
*H04N 5/232* (2006.01)
*H04N 9/04* (2006.01)

(52) U.S. Cl.
CPC ... *H04N 5/232122* (2018.08); *H04N 9/04557* (2018.08); *H04N 9/64* (2013.01)

(56) References Cited

U.S. PATENT DOCUMENTS

| | | | | |
|---|---|---|---|---|
| 8,675,116 | B2* | 3/2014 | Onuki | G02B 7/346 348/340 |
| 9,172,926 | B2* | 10/2015 | Aoki | H04N 5/345 |
| 2008/0266667 | A1* | 10/2008 | Min | H01L 27/14627 359/626 |
| 2009/0115882 | A1* | 5/2009 | Kawarada | G03B 7/28 348/340 |
| 2009/0167927 | A1 | 7/2009 | Kusaka | |
| 2010/0214452 | A1* | 8/2010 | Kawarada | G02B 7/346 348/255 |
| 2013/0127002 | A1* | 5/2013 | Okigawa | H04N 5/23212 257/432 |
| 2013/0140663 | A1* | 6/2013 | Fukuda | G03B 13/36 257/432 |
| 2014/0267865 | A1* | 9/2014 | Kishi | G03B 13/36 348/310 |
| 2015/0009367 | A1 | 1/2015 | Kobayashi | |
| 2015/0229847 | A1* | 8/2015 | Aoki | H04N 9/045 348/333.05 |
| 2015/0296125 | A1* | 10/2015 | Kusaka | G02B 7/34 348/349 |
| 2016/0198105 | A1 | 7/2016 | Kawai et al. | |

FOREIGN PATENT DOCUMENTS

| | | |
|---|---|---|
| JP | 2013157531 | 8/2013 |
| WO | 2013145886 | 10/2013 |
| WO | 2015045785 | 4/2015 |

OTHER PUBLICATIONS

"Written Opinion of the International Searching Authority (Form PCT/ISA/237) of PCT/JP2017/016820", dated Aug. 1, 2017, with English translation thereof, pp. 1-9.

* cited by examiner

IMAGING ELEMENT AND IMAGING DEVICE

CROSS REFERENCE TO RELATED APPLICATION

This is a continuation of International Application No. PCT/JP2017/016820 filed on Apr. 27, 2017, and claims priority from Japanese Patent Application No. 2016-110393 filed on Jun. 1, 2016, the entire disclosures of which are incorporated herein by reference.

BACKGROUND OF THE INVENTION

1. Field of the Invention

The present invention relates to an imaging element and an imaging device.

2. Description of the Related Art

With an increase in resolution of imaging elements, such as a charge coupled device (CCD) image sensor and a complementary metal oxide semiconductor (CMOS) image sensor, there is a rapid increase in demand for information devices having an imaging function, such as a digital still camera, a digital video camera, and a mobile phone such as a smartphone. The information devices having an imaging function described above are referred to as imaging devices.

In these imaging devices, a phase difference auto focus (AF) method (see JP2009-159226A and JP2008-177903A) is employed as a focusing control method of focusing on a main subject.

For example, an imaging element in which pairs of phase-difference detecting pixels of which photoelectric conversion areas are eccentric to each other in an opposite direction are discretely formed on the entire surface of a light receiving surface is used as an imaging element mounted on an imaging device that performs focusing control by the phase-difference AF method (see JP2009-159226A and JP2008-177903A).

JP2009-159226A describes the imaging element having the pairs of the phase-difference detecting pixels arranged in positions in which pixels that photoelectrically convert blue light rays are arranged and phase-difference detecting pixels arranged in positions in which pixels that photoelectrically convert green light rays are arranged.

JP2008-177903A describes the imaging element having a pair of phase-difference detecting pixels for detecting a phase difference in a horizontal direction and a pair of phase-difference detecting pixels for detecting a phase difference in a vertical direction. These two kinds of pairs are arranged on the light receiving surface.

SUMMARY OF THE INVENTION

The photoelectric conversion area of the phase-difference detecting pixel is smaller than that of another normal pixel (imaging pixel). Thus, it is insufficient in using an output signal of the phase-difference detecting pixel as a pixel signal for generating captured image data. It is necessary to correct the output signal of the phase-difference detecting pixel.

As a method of correcting the output signals of the phase-difference detecting pixel, there is interpolation correction for generating a pixel signal corresponding to a position of the phase-difference detecting pixel by using the output signals of the imaging pixels near the phase-difference detecting pixel through interpolation.

As this correction method, there is gain correction for generating a pixel signal corresponding to a position of the phase-difference detecting pixel by multiplying the output signal of the phase-difference detecting pixel by a gain corresponding to a ratio of sensitivity between the phase-difference detecting pixel and the imaging pixels in the vicinity of the phase-difference detecting pixel.

In the interpolation correction, the interpolation is performed by using the output signal of the imaging pixel present in a position different from the phase-difference detecting pixel on the light receiving surface. Thus, in a case where a subject having a fine pattern is captured, there is a possibility that the quality of the captured image will deteriorate through the correction.

In general, image processing is performed on color captured image signals output from the imaging element, and the processed captured image signals are converted into captured image data constituted by brightness signals and color difference signals. A color difference allows the visual perception of a person so as not to feel deterioration in image quality even though the resolution of the color difference signal is lowered so as to be lower than brightness. That is, the quality of the captured image data is determined by the quality of the brightness signals.

Thus, in a case where the color component of the pixel signal obtained by correcting the output signal of the phase-difference detecting pixel has a large degree of contribution to the brightness signals, it is preferable that not the interpolation correction but the gain correction is employed as the method of correcting the output signal of the phase-difference detecting pixel.

However, since the phase-difference detecting pixel is a pixel of which the photoelectric conversion area is eccentric to a detection direction of the phase difference, the level of the output signal is different depending on the position on the light receiving surface.

For example, among the pairs of phase-difference detecting pixels for detecting phase differences in left and right directions on the light receiving surface, the phase-difference detecting pixel of which the photoelectric conversion area is eccentric to a right direction is a right-eccentric pixel.

In this case, an output signal of the right-eccentric pixel present near an edge portion of the light receiving surface in a left direction is weaker than an output signal of the right-eccentric pixel present near an edge portion of the light receiving surface in the right direction. Such an output signal difference tends to become large due to an increase in angle of an imaging lens or an increase in size of the light receiving surface.

Thus, in a case where the gain correction is performed on the output signal of the phase-difference detecting pixel present near the edge portion of the light receiving surface in the detection direction of the phase difference, the gain needs to have a large value. However, in a case where the gain is too large, since noise increases, it is necessary to restrict the maximum value of the gain.

In a case where the maximum value of the gain is restricted, even though the gain correction is performed on the output signal in the phase-difference detecting pixel present near the edge portion of the light receiving surface, it is difficult to return the output signal to the level available as the pixel signal for generating the captured image data.

JP2009-159226A and JP2008-177903A do not consider the aforementioned problems in a case where the gain correction is performed.

The present invention has been made in view of such circumstances, and an object of the present invention is to provide an imaging element capable of improving the quality of a captured image by employing gain correction as a method of correcting output signals of phase-difference detecting pixels having the largest degree of contribution to brightness signals, and an imaging device comprising the imaging element.

An imaging element according to the present invention is an imaging element that has a plurality of pixels which photoelectrically converts light rays having different colors, and has a light receiving surface on which the plurality of pixels is arranged in two dimensions according to a regular pattern. The plurality of pixels includes first pixels that output signals each having first color components which most contribute to obtainment of brightness signals, and second pixels that output signals having color components other than the first color component, the first pixels include a first imaging pixel having a photoelectric conversion area in a reference position, a first phase-difference detecting pixel having a photoelectric conversion area in a position eccentric to one side in a predetermined direction with respect to the reference position, and a second phase-difference detecting pixel having a photoelectric conversion area in a position eccentric to the other side in the predetermined direction with respect to the reference position, each of the second pixels is a second imaging pixel having a photoelectric conversion area in the reference position, a pair row constituted by pairs, which include a plurality of first pairs of the first phase-difference detecting pixels arranged in arrangement positions of the first pixels based on the pattern and the second phase-difference detecting pixels arranged in arrangement positions of the second pixels based on the pattern and a plurality of second pairs of the second phase-difference detecting pixels arranged in the arrangement positions of the first pixels based on the pattern and the first phase-difference detecting pixels arranged in the arrangement positions of the second pixels based on the pattern and are arranged in the predetermined direction, is formed on the light receiving surface, the plurality of first pairs included in the pair row is arranged so as to be closer to the one side from a predetermined position in the predetermined direction of the pair row, and the plurality of second pairs included in the pair row is arranged so as to be closer to the other side from the predetermined position in the predetermined direction of the pair row.

An imaging device according to the present invention comprises the imaging element, and an image processing unit that generates captured image data based on signals output from the plurality of pixels of the imaging element.

According to the present invention, it is possible to provide an imaging element capable of improving the quality of a captured image by employing gain correction as a method of correcting output signals of phase-difference detecting pixels having the largest degree of contribution to brightness signals, and an imaging device comprising the imaging element.

DESCRIPTION OF THE PREFERRED EMBODIMENTS

Hereinafter, an embodiment of the present invention will be described with reference to the drawings.

Figure 1:
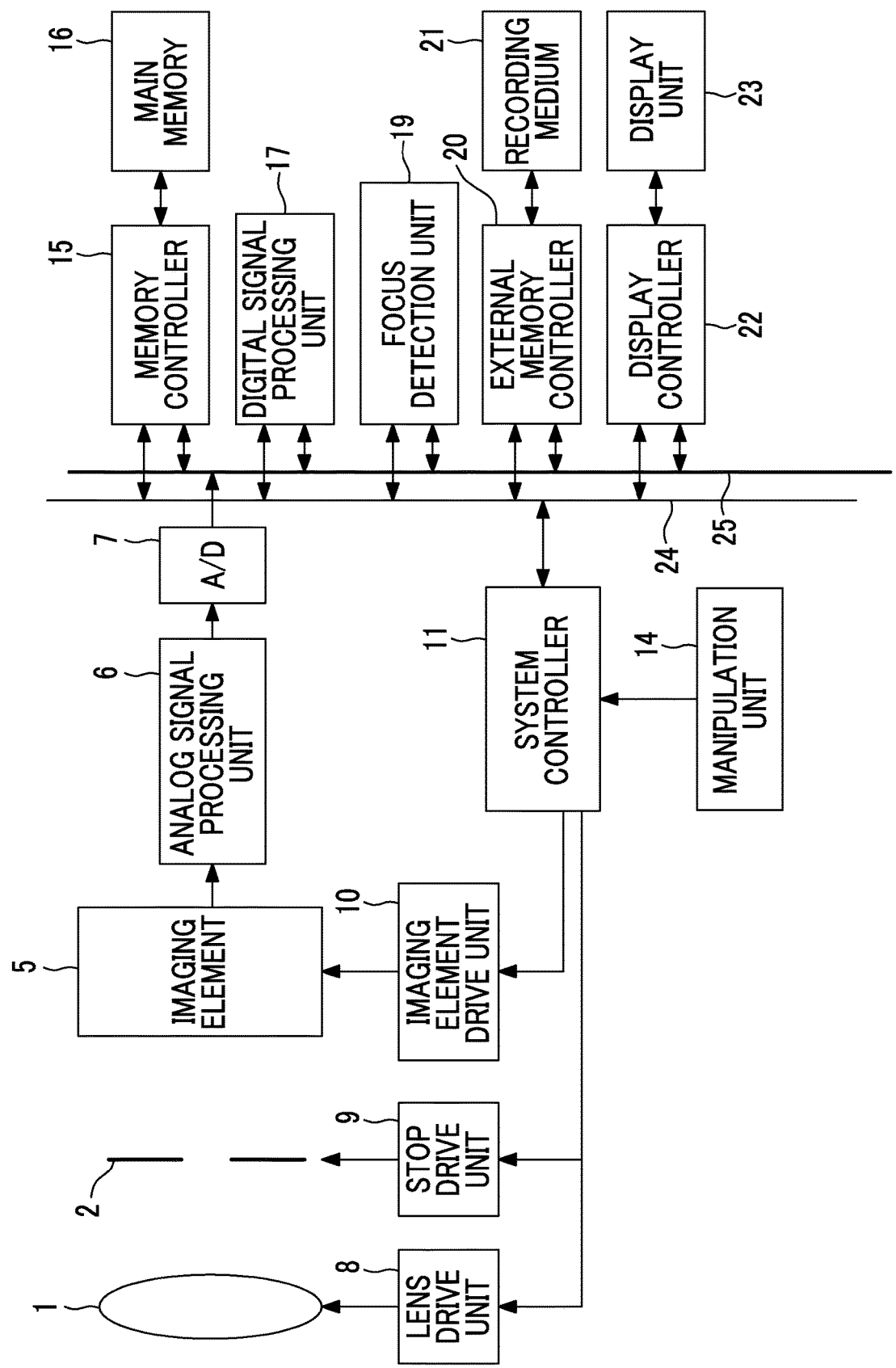
FIG. 1 is a diagram showing a schematic configuration of a digital camera which is an embodiment of an imaging device according to the present invention.

FIG. 1 is a diagram showing a schematic configuration of a digital camera which is an embodiment of an imaging device according to the present invention.

An imaging system of the digital camera shown in FIG. 1 comprises an imaging optical system having an imaging lens 1 and a stop 2, and an imaging element 5 such as a CCD image sensor or a CMOS sensor.

The imaging lens 1 includes at least a focus lens. The focus lens is a lens for adjusting a focus position of the imaging optical system, and is composed of a single lens or a plurality of lenses. The focus lens moves in an optical axis direction of the imaging optical system, and thus, the focus position is adjusted.

The imaging element 5 is configured such that a plurality of imaging pixels and phase-difference detecting pixels that respectively receive a pair of luminous flux passed through different portions of a pupil area of the imaging optical system are arranged in two dimensions.

The imaging element 5 may output a captured image signal obtained by photoelectrically converting an optical image formed by the imaging lens 1, and may output a pair of image signals corresponding to the pair of luminous flux.

A system controller 11 that generally controls the entire electric control system of the digital camera controls a lens drive unit 8, and adjusts a position of the focus lens included in the imaging lens 1. The system controller 11 adjusts an exposure value by controlling an opening degree of the stop 2 through a stop drive unit 9.

The system controller 11 drives the imaging element 5 through an imaging element drive unit 10, and outputs, as a captured image signal, a subject image captured through the imaging lens 1. A command signal from a user is input to the system controller 11 through a manipulation unit 14.

The electric control system of the digital camera comprises an analog signal processing unit 6 that performs analog signal processing such as sampling two correlation pile which is connected to an output of the imaging element 5, and an analog-to-digital (A/D) conversion circuit 7 that converts a color signal of a red (R) component, a color signal of a green (G) component, and a color signal of a blue (B) component which are output from the analog signal processing unit 6 into digital signals. The analog signal processing unit 6 and the A/D conversion circuit 7 are controlled by the system controller 11.

The electric control system of the digital camera further comprises a main memory 16, a memory controller 15 that is connected to the main memory 16, a digital signal processing unit 17 that generates captured image data by performing image processing on the captured image signal obtained through the imaging using the imaging element 5, a focus detection unit 19 that calculates a defocus value of the imaging lens 1 based on a phase difference between the pair of image signals output from the phase-difference detecting pixels of the imaging element 5, an external memory controller 20 to which an attachable and detachable recording medium 21 is connected, and a display controller 22 to which a display unit 23 mounted on a camera rear surface is connected.

The memory controller 15, the digital signal processing unit 17, the focus detection unit 19, the external memory controller 20, and the display controller 22 are connected to each other through a control bus 24 and a data bus 25, and are controlled according to a command from the system controller 11.

Each of the system controller 11 and the digital signal processing unit 17 includes various processors that perform processing by executing programs, a random access memory (RAM), and a read only memory (ROM).

In the present specification, the various processors include a central processing unit (CPU) which is a general-purpose processor that performs various processing, a programmable logic device (PLD) which is a processor capable of changing a circuit configuration after a field-programmable gate array is manufactured, and a dedicated electric circuit which is a processor having a dedicated circuit configuration designed for performing a specific process such as an Application-Specific Integrated Circuit (ASIC).

More specifically, the structures of the various processors are electric circuits obtained by combining circuit elements such as semiconductor devices.

Each of the system controller 11 and the digital signal processing unit 17 may be constituted by one of the various processors, or may be constituted by a combination (for example, a combination of a plurality of FPGAs or a combination of the CPU and the FPGA) of two or more processors of the same type or different types.

Figure 2:
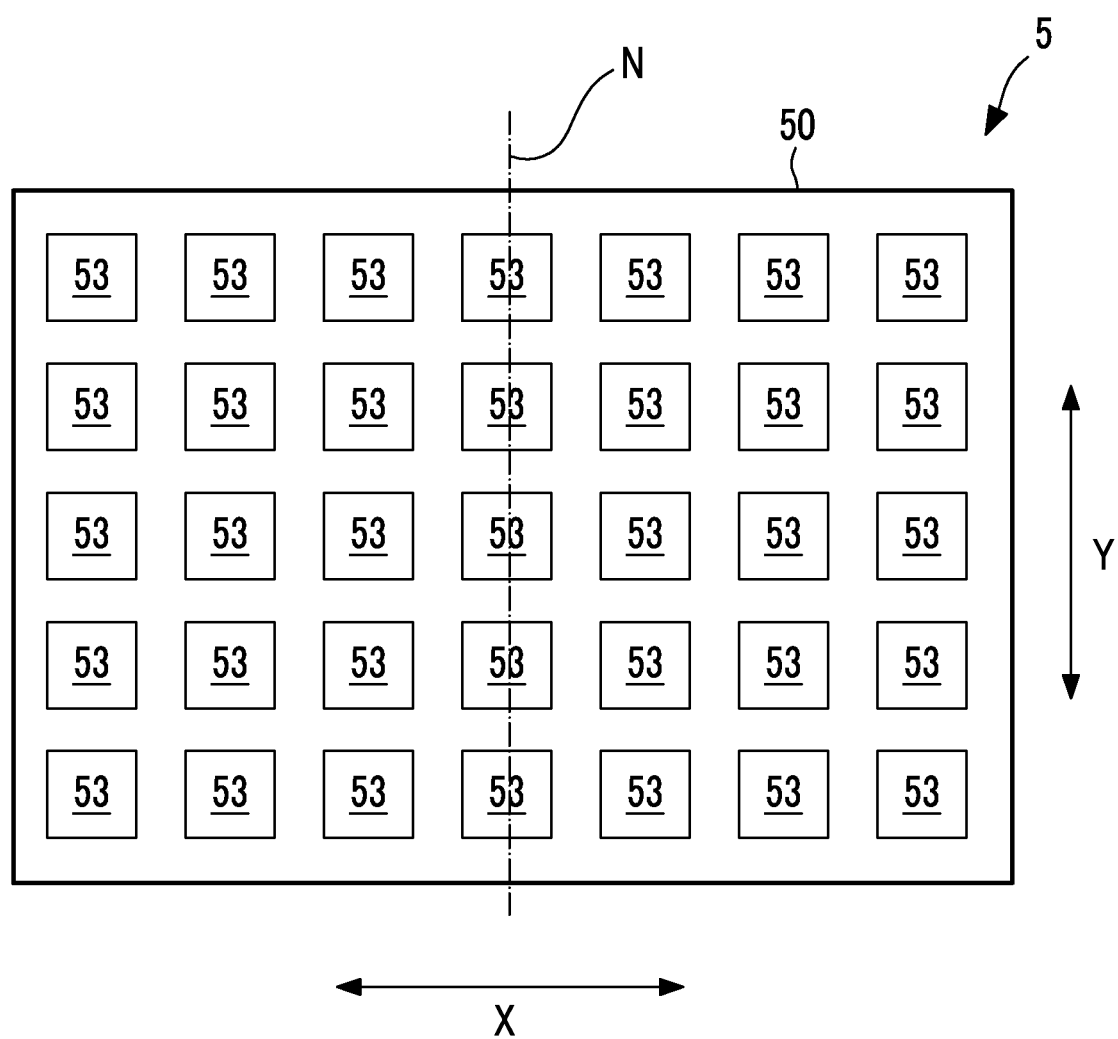
FIG. 2 is a planar schematic diagram showing a schematic configuration of an imaging element 5 mounted on the digital camera shown in FIG. 1.

FIG. 2 is a planar schematic diagram showing a schematic configuration of the imaging element 5 mounted on the digital camera shown in FIG. 1.

A plurality of pixels (not shown) arranged on a light receiving surface 50 of the imaging element 5 in two dimensions in a row direction X (left-right direction) and a column direction (upper-lower direction) Y perpendicular to the row direction X.

A plurality of rectangular phase-difference detecting areas 53 is set in any area position of the light receiving surface 50 (in the illustrated example, a substantially entire area within the light receiving surface 50). The phase-difference detecting areas 53 are areas set so as to include the phase-difference detecting pixels on the light receiving surface 50 as a range corresponding to a subject as a target to be in focus.

Each of 35 phase-difference detecting areas 53 shown in FIG. 2 is a minimum size settable as the phase-difference detecting area 53, and the phase-difference detecting area having a size greater than a minimum size may be set on the light receiving surface 50.

A straight line N which extends in the column direction Y shown in FIG. 2 represents a virtual straight line which passes through an intersection of an optical axis of the imaging optical system of the digital camera and the light receiving surface 50 and extends in the column direction Y.

In the configuration example shown in FIG. 2, the row direction X corresponds to "any direction" described in claims, the column direction Y corresponds to a "perpendicular direction" described in claims, a "left direction" corresponds to "one side in the row direction X" described in claims, and a right direction corresponds to "the other side in the row direction X" described in claims. A position of the straight line N in the row direction X corresponds to "any position" described in claims.

Figure 3:
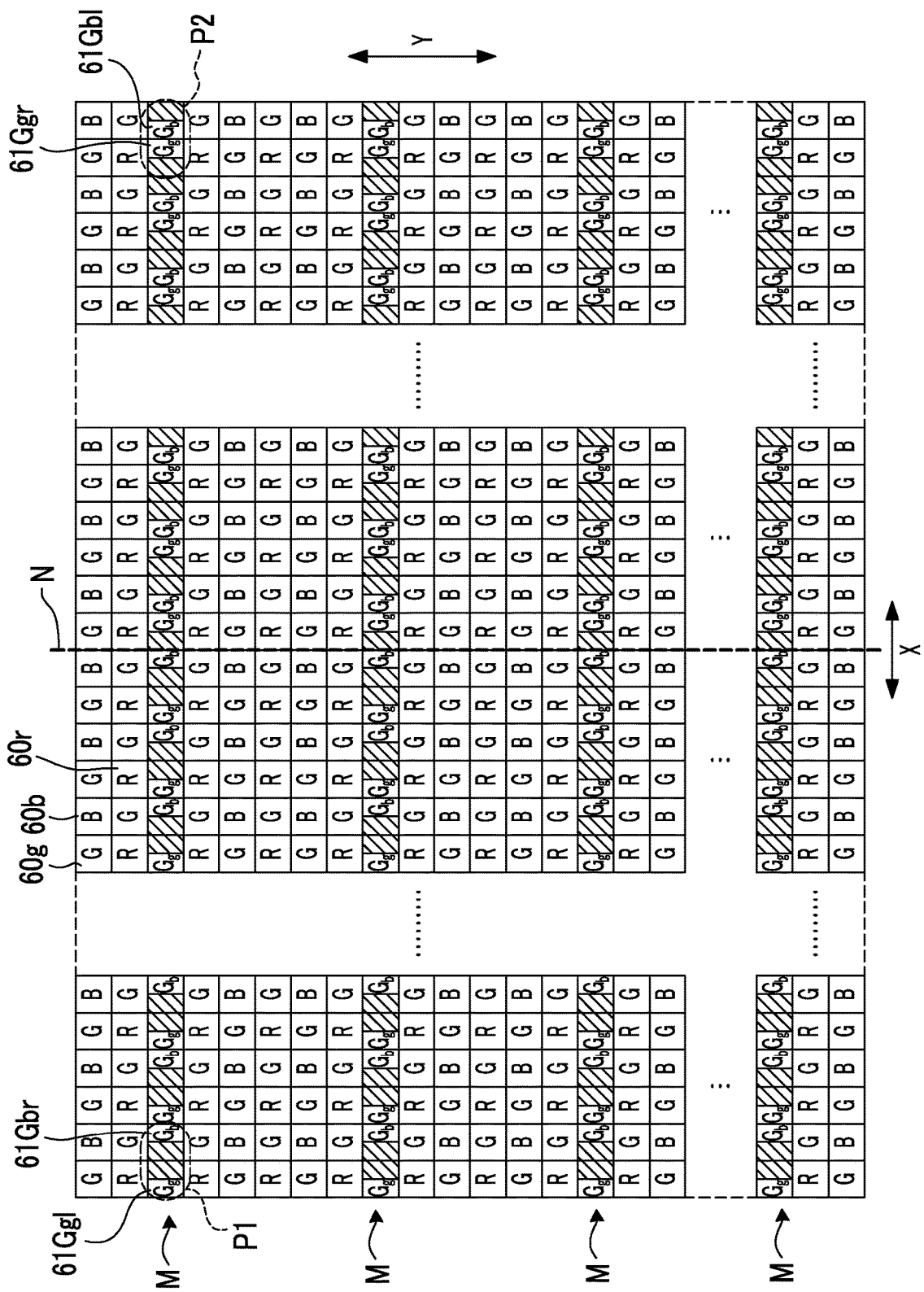
FIG. 3 is an enlarged schematic diagram of a light receiving surface 50 shown in FIG. 2.

FIG. 3 is an enlarged schematic diagram of the light receiving surface 50 shown in FIG. 2.

Imaging pixels 60*r* (blocks assigned "R" in this diagram) that output signals (R signals) having R components obtained by photoelectrically converting R light rays, imaging pixels 60*g* (blocks assigned "G" in this diagram) that output signal (G signals) having G components obtained by photoelectrically converting G light rays, and imaging pixels 60*b* (blocks assigned "B in this diagram) that output signals (B signals) having B components obtained by photoelectrically converting B light rays are arranged in two dimensions on the light receiving surface 50 of the imaging element 5 according to a Bayer array which is a regular pattern.

In a left area from the straight line N of the light receiving surface 50 of the imaging element 5, left-eccentric phase-difference detecting pixels 61Ggl that output G signals obtained by photoelectrically converting the G light rays are arranged in some of arrangement positions (positions in which the imaging pixels 60*g* are arranged according to the Bayer array) of the imaging pixels 60*g* based on the Bayer array.

In the left area from the straight line N of the light receiving surface 50 of the imaging element 5, right-eccentric phase-difference detecting pixels 61Gbr that output G signals obtained by photoelectrically converting the G light rays are arranged in some of the arrangement positions (positions in which the imaging pixels 60*b* are arranged according to the Bayer array) of the imaging pixels 60*b* based on the Bayer array.

In a right area from the straight line N of the light receiving surface 50 of the imaging element 5, right-eccentric phase-difference detecting pixels 61Ggr that output G signals obtained by photoelectrically converting the G light rays are arranged in some of arrangement positions of the imaging pixels 60*g* based on the Bayer array.

In the right area from the straight line N of the light receiving surface 50 of the imaging element 5, left-eccentric phase-difference detecting pixels 61Gbl that output G signals obtained by photoelectrically converting the G light rays are arranged in some of arrangement positions of the imaging pixels 60*b* based on the Bayer array.

Figure 4:
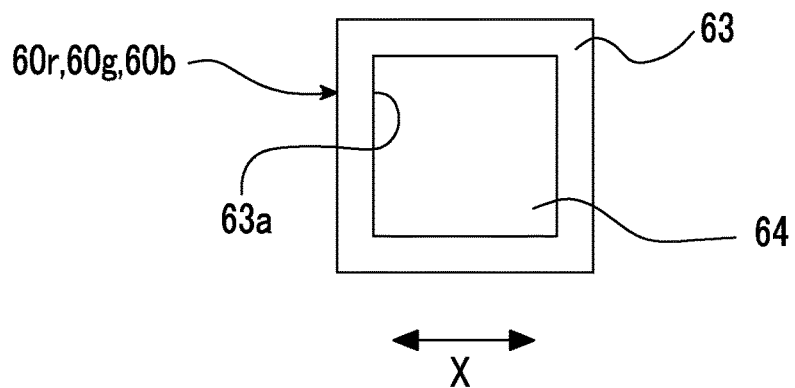
FIG. 4 is a planar schematic diagram showing a pixel configuration of each of imaging pixels 60r, 60g, and 60b shown in FIG. 3.
Figure 5:
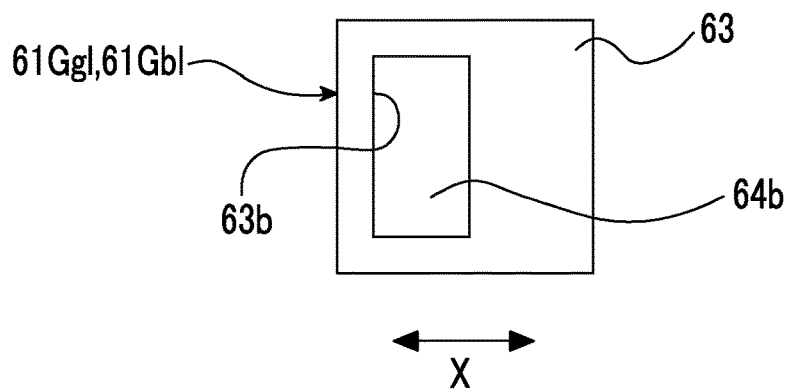
FIG. 5 is a planar schematic diagram showing a pixel configuration of each of left-eccentric phase-difference detecting pixels 61Ggl and 61Gbl shown in FIG. 3.
Figure 6:
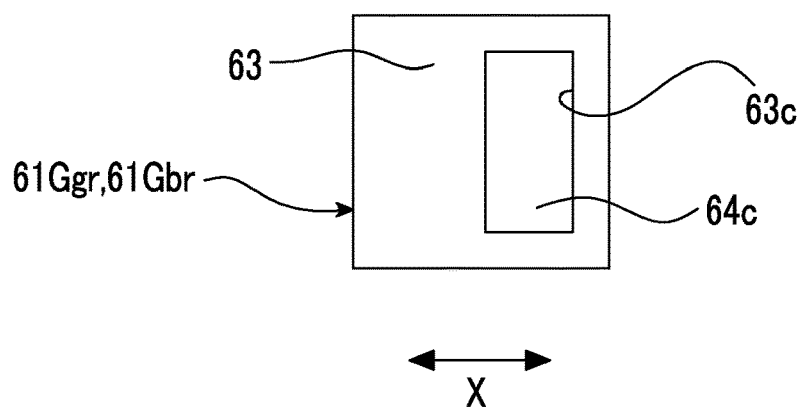
FIG. 6 is a planar schematic diagram showing a pixel configuration of each of right-eccentric phase-difference detecting pixels 61Ggr and 61Gbr shown in FIG. 3.

FIG. 4 is a planar schematic diagram showing a pixel configuration of each of the imaging pixels 60*r*, 60*g*, and 60*b* shown in FIG. 3. FIG. 5 is a planar schematic diagram showing a pixel configuration of each of the left-eccentric phase-difference detecting pixels 61Ggl and 61Gbl shown in FIG. 3. FIG. 6 is a planar schematic diagram showing a pixel configuration of each of the right-eccentric phase-difference detecting pixels 61Ggr and 61Gbr shown in FIG. 3.

As shown in FIG. 4, each of the imaging pixels 60*r*, 60*g*, and 60*b* has an opening 63*a* in a position in which a light shielding film 63 formed on a photoelectric conversion unit (photodiode) overlaps the substantially entire area of the photoelectric conversion unit, and the photoelectric conversion unit overlapping the opening 63*a* constitutes a photoelectric conversion area 64.

A central position of the photoelectric conversion area 64 in the row direction X represents a position of the photoelectric conversion area 64, and this position is a reference position. The imaging pixels 60*r*, 60*g*, and 60*b* are pixels that receive both a pair of luminous flux (the light rays passed through the left side and the light rays passed through the right side from a main axis of the imaging lens 1) passed through the different portions of the pupil area of the imaging lens 1 shown in FIG. 1, and photoelectrically convert the received light rays.

As shown in FIG. 5, each of the left-eccentric phase-difference detecting pixels 61Ggl and 61Gbl is configured such that a center of an opening 63*b* of the light shielding film 63 formed on the photoelectric conversion unit is formed so as to be eccentric to the left side with the opening 63*a* of FIG. 4, and a photoelectric conversion unit overlapping the opening 63*b* constitutes a photoelectric conversion area 64*b*.

A center of the photoelectric conversion area 64*b* in the row direction X represents a position of the photoelectric conversion area 64*b*, and this position is a position eccentric to the left side with respect to the position of the photoelectric conversion area 64. The left-eccentric phase-difference detecting pixels 61Ggl and 61Gbl are pixels that receive the light rays of one of the pair of luminous flux, and photoelectrically convert the received light rays. Each of the left-eccentric phase-difference detecting pixels 61Ggl and 61Gbl constitutes a first phase-difference detecting pixel.

As shown in FIG. 6, each of the right-eccentric phase-difference detecting pixels 61Ggr and 61Gbr is configured such that a center of an opening 63*c* of the light shielding film 63 formed on the photoelectric conversion unit is formed so as to be eccentric to the right side with respect to the opening 63*a* of FIG. 4, and a photoelectric conversion unit overlapping the opening 63*c* constitutes a photoelectric conversion area 64*c*.

A center of the photoelectric conversion area 64*c* in the row direction X represents a position of the photoelectric conversion area 64*c*, and this position is a position eccentric to the right side with respect to the position of the photoelectric conversion area 64. The right-eccentric phase-difference detecting pixels 61Ggr and 61Gbr are pixels that receive the light rays of the other one of the pair of luminous flux, and photoelectrically convert the received light rays. Each of the right-eccentric phase-difference detecting pixels 61Ggr and 61Gbr constitutes a second phase-difference detecting pixel.

As stated above, a total of seven kinds of pixels such as the imaging pixels 60*r*, the imaging pixels 60*g*, the imaging pixels 60*b*, the left-eccentric phase-difference detecting pixels 61Ggl and 61Gbl, and the right-eccentric phase-difference detecting pixels 61Ggr and 61Gbr are arranged on the light receiving surface 50 of the imaging element 5 in two dimensions.

The digital signal processing unit 17 of the digital camera shown in FIG. 1 performs a demosaicing process on the captured image signal which is an aggregation of output signals of all the pixels included in the imaging element 5, generates the R signals, the G signals, and the B signals so as to correspond to the positions of the pixels of the imaging element 5, and generates brightness signals corresponding to the positions of the pixels by adding weight to the R signals, the G signals, and the B signals.

For example, the digital signal processing unit 17 obtains the brightness signals by adding weight to the R signals, the G signals, and the B signals in a proportion of 3:6:1.

The digital signal processing unit 17 generates color difference signals by using the brightness signals, the R signals, the G signals, and the B signals. Through such processing, pixel signals including the brightness signals and the color difference signals are generated so as to correspond to the positions of the pixels of the imaging element 5, and the captured image data is constituted by an aggregation of pixel signals.

Accordingly, in the imaging element 5 mounted on the digital camera shown in FIG. 1, among the pixels (the imaging pixels 60*r*) that output the R signals, the pixels (the imaging pixels 60*g*, the left-eccentric phase-difference detecting pixels 61Ggl and 61Gbl, and the right-eccentric phase-difference detecting pixels 61Ggr and 61Gbr) that output the G signals, and the pixels (the imaging pixels 60*b*) that output the B signals, the pixels that output the G signals are first pixels that output signals each having a color component (first color component) which most contribute to the obtainment of the brightness signals, and the pixels that output the B signals and the pixels that output the R signals are second pixels that output color signals other than the first color component.

In the example shown in FIG. 3, among pixel rows constituted by a plurality of pixels which are formed on the light receiving surface 50 and are arranged in the row direction X, some of a plurality of GB pixel rows in which the pixels that output the G signals and the pixels that output the B signals are alternately arranged in the row direction X are phase-difference detecting pixel rows M.

The phase-difference detecting pixel rows M are arranged on the light receiving surface 50 at, for example, equal intervals in the column direction Y (are arranged in a proportion of one of six pixel rows in the example of FIG. 3).

In the phase-difference detecting pixel rows M on the left side from the straight line N, the left-eccentric phase-difference detecting pixels 61Ggl are arranged in the positions in which the pixels that output the G signals are arranged in the Bayer array, and the right-eccentric phase-difference detecting pixels 61Gbr are arranged in the positions in which the pixels that output the B signals are arranged in the Bayer array.

A first pair P1 is constituted by each of the left-eccentric phase-difference detecting pixels 61Ggl included in the phase-difference detecting pixel rows M and the right-eccentric phase-difference detecting pixel 61Gbr present in the position closest to each left-eccentric phase-difference detecting pixel 61Ggl in the right direction.

In the phase-difference detecting pixel rows M on the right side from the straight line N, the right-eccentric phase-difference detecting pixels 61Ggr are arranged in the positions in which the pixels that output the G signals are arranged in the Bayer array, and the left-eccentric phase-difference detecting pixels 61Gbl are arranged in the positions in which the pixels that output the B signals are arranged in the Bayer array.

A second pair P2 is constituted by each of the right-eccentric phase-difference detecting pixels 61Ggr included in the phase-difference detecting pixel rows M and the left-eccentric phase-difference detecting pixel 61Gbl present in the position closest to each right-eccentric phase-difference detecting pixel 61Ggr in the right direction.

As stated above, each phase-difference detecting pixel row M is constituted by a plurality of first pairs, which includes a plurality of first pairs P1 each having the left-eccentric phase-difference detecting pixel 61Ggl and the right-eccentric phase-difference detecting pixel 61Gbr arranged on the left side from the straight line N and a plurality of second pairs P2 each having the right-eccentric phase-difference detecting pixel 61Ggr and the left-eccentric phase-difference detecting pixel 61Gbl arranged on the right side from the straight line N, and is arranged in the row direction X. The phase-difference detecting pixel rows M constitute a pair row.

In each phase-difference detecting pixel row M, the plurality of first pairs P1 is arranged on the left side from the straight line N, and the plurality of second pairs P2 is arranged on the right side from the straight line N.

The focus detection unit 19 shown in FIG. 1 calculates a phase difference between the pair of image signals captured through division areas obtained by dividing the pupil area of the imaging optical system into two in the row direction X based on the output signals of the phase-difference detecting pixels included in the phase-difference detecting area 53 selected by a user of the digital camera.

For example, the focus detection unit 19 calculates a phase difference by performing a correlation operation on output signal groups of the left-eccentric phase-difference detecting pixels 61Ggl and the right-eccentric phase-difference detecting pixels 61Gbr constituting the first pairs P1 of each phase-difference detecting pixel row M included in the selected phase-difference detecting area 53, and calculates a defocus value based on the calculated phase difference.

Alternatively, the focus detection unit 19 calculates a phase difference by performing a correlation operation on output signal groups of the right-eccentric phase-difference detecting pixels 61Ggr and the left-eccentric phase-difference detecting pixels 61Gbl constituting the second pairs P2 included in the selected phase-difference detecting area 53, and calculates the defocus value based on the calculated phase difference.

The system controller 11 shown in FIG. 1 adjusts the focus by controlling the position of the focus lens included in the imaging lens 1 based on the defocus value calculated by the focus detection unit 19.

In a case where an imaging command is received in a state in which the focus is adjusted, the system controller 11 causes the imaging element 5 to perform the imaging, and causes the captured image signal output from the imaging element 5 through the imaging to be input to the digital signal processing unit 17.

The digital signal processing unit 17 generates the captured image data by performing image processing on the captured image signal. The image processing includes demosaicing processing, gamma-correction processing, and white balance adjustment processing. The digital signal processing unit 17 constitutes an image processing unit that generates the captured image data based on the signals output from the pixels of the imaging element 5.

Figure 7:
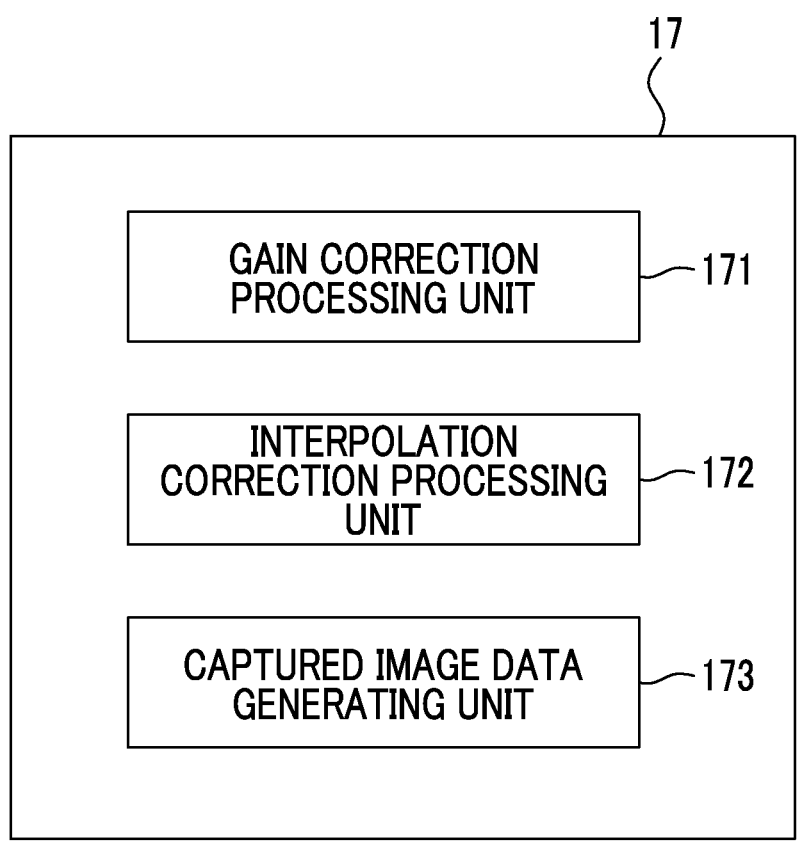
FIG. 7 is a functional block diagram of a digital signal processing unit 17 of the digital camera shown in FIG. 1.

FIG. 7 is a functional block diagram of the digital signal processing unit 17 of the digital camera shown in FIG. 1.

The digital signal processing unit 17 comprises a gain correction processing unit 171, an interpolation correction processing unit 172, and a captured image data generating unit 173.

The gain correction processing unit 171, the interpolation correction processing unit 172, the captured image data generating unit 173 are functional blocks formed by a program executed by a processor included in the digital signal processing unit 17. The gain correction processing unit 171 and the interpolation correction processing unit 172 constitute a correction unit.

The gain correction processing unit 171 generates pixel signals corresponding to the positions of the left-eccentric phase-difference detecting pixels Ggl and the right-eccentric phase-difference detecting pixels Ggr by multiplying the output signals of the left-eccentric phase-difference detecting pixels Ggl and the right-eccentric phase-difference detecting pixels Ggr by a gain.

The interpolation correction processing unit 172 generates the pixel signals corresponding to the positions of the left-eccentric phase-difference detecting pixels Gbl and the right-eccentric phase-difference detecting pixels Gbr based on the output signals (B signals) of the imaging pixels 60b present near the left-eccentric phase-difference detecting pixels Gbl and the right-eccentric phase-difference detecting pixels Gbr through interpolation.

For example, the interpolation correction processing unit 172 calculates an average of the output signals of two imaging pixels 60b vertically adjacent to the left-eccentric phase-difference detecting pixel Gbl, and uses the average as the pixel signal corresponding to the position of the left-eccentric phase-difference detecting pixel Gbl.

The captured image data generating unit 173 generates the captured image data constituted by the brightness signals and the color difference signals based on the output signals of the imaging pixels 60r, the output signals of the imaging pixels 60g, and the output signal of the imaging pixels 60b which are included in the captured image signal, the signals obtained by correcting the output signals of the left-eccentric phase-difference detecting pixels Ggl and the right-eccentric phase-difference detecting pixels Ggr by means of the gain correction processing unit 171, and the pixel signals corresponding to the positions of the left-eccentric phase-difference detecting pixels Gbl and the right-eccentric phase-difference detecting pixels Gbr generated by the interpolation correction processing unit 172 through the interpolation.

For example, the generated captured image data may be recorded in the recording medium 21 through the external memory controller 20 or may be displayed on the display unit 23 through the display controller 22, as an image.

As stated above, the imaging element 5 of the digital camera shown in FIG. 1 has a configuration in which the left-eccentric phase-difference detecting pixels 61Ggl are arranged in the left area of the light receiving surface 50 from the straight line N and the right-eccentric phase-difference detecting pixels 61Ggr are arranged in the right area of the light receiving surface 50.

With such a configuration, sensitivity characteristics of the left-eccentric phase-difference detecting pixel 61Ggl and the right-eccentric phase-difference detecting pixel 61Ggr having the same distance from the straight line N may be equal to each other.

That is, it is possible to restrain the levels of the output signals of the phase-difference detecting pixels that output the G signals on the right side or the left side of the straight line N from relatively decreasing.

Thus, the output signals of the left-eccentric phase-difference detecting pixels 61Ggl and the right-eccentric phase-difference detecting pixels 61Ggr can be returned to the levels available as the pixel signals by an appropriate gain. The gain does not increase and thus, it is possible to improve the quality of the captured image by suppressing noise.

The output signals of the left-eccentric phase-difference detecting pixels 61Ggl and the right-eccentric phase-difference detecting pixels 61Ggr are the G signals, and have the largest degree of contribution to the brightness signals. Accordingly, gain correction processing is performed on the output signals, and thus, it is possible to improve the quality of the captured image.

Meanwhile, the pixel signals corresponding to the positions of the left-eccentric phase-difference detecting pixels 61Gbl and the right-eccentric phase-difference detecting pixels 61Gbr are generated through the interpolation based on the B signals which are the output signals of the imaging pixels 60*b*.

The B signals among the R signals, the G signals, and the B signals have the largest degree of contribution to the brightness signals. Accordingly, it is possible to minimize the influence on the quality of the captured image by generating the pixel signals corresponding to the positions of the left-eccentric phase-difference detecting pixels 61Gbl and the right-eccentric phase-difference detecting pixels 61Gbr through the interpolation.

Although it has been described in the aforementioned embodiment that the phase-difference detecting pixels are arranged in some of the positions in which the imaging pixels 60*g* and the imaging pixels 60*b* are arranged according to the Bayer array, the present invention is not limited thereto.

For example, the phase-difference detecting pixels may be arranged in the positions in which the imaging pixels 60*g* and the imaging pixels 60*r* are arranged according to the Bayer array.

That is, among the pixel rows formed on the light receiving surface 50, some of a plurality of RG pixel rows in which the pixels that output the R signals and the pixels that output the G signals are alternately arranged in the row direction X are the phase-difference detecting pixel rows M.

With such a configuration, in each phase-difference detecting pixel row M on the left side from the straight line N, the left-eccentric phase-difference detecting pixels 61Ggl are arranged in the positions in which the imaging pixels 60*g* are arranged, and the right-eccentric phase-difference detecting pixels 61Gbr are arranged in the positions in which the imaging pixels 60*r* are arranged.

In each phase-difference detecting pixel row M on the right side from the straight line N, the right-eccentric phase-difference detecting pixels 61Ggr are arranged in the positions in which the imaging pixels 60*g* are arranged, and the left-eccentric phase-difference detecting pixels 61Gbl are arranged in the positions in which the imaging pixels 60*r* are arranged.

Since the R signals have the degree of contribution to the brightness signals smaller than the G signals, it is possible to obtain the advantage of improving the quality of the captured image even with such a configuration.

In the phase-difference detecting pixel row M, a boundary between a portion in which the first pairs P1 are arranged in the row direction X and a portion in which the second pairs P2 are arranged in the row direction X is determined by the position of the straight line N. However, the position of the boundary is not limited to the position of the straight line N.

For example, a boundary between a portion in which the first pairs P1 of each phase-difference detecting pixel row M are arranged and a portion in which the second pairs P2 are arranged may be formed by a straight line which is parallel to the straight line N and is present so as to be shifted from the straight line N in the right direction or the left direction by two pixels.

Alternatively, the boundary between a portion in which the first pairs P1 of each phase-difference detecting pixel row M are arranged and a portion in which the second pairs P2 are arranged may be formed by a straight line which is parallel to the straight line N and passes through an area between each of five phase-difference detecting areas 53 present in the center of the row direction X of FIG. 2 and the phase-difference detecting areas 53 horizontally adjacent thereto in the row direction X.

Although it has been described that the position of the boundary in the row direction X in the phase-difference detecting pixel row M is any position, it is preferable that the position of the boundary is present in the vicinity of the position of the straight line N.

For example, the vicinity of the straight line N means that the boundary is close to the straight line N to extent that the quality of the captured image is allowed, and means a position within a range in which the boundary is separated from the position of the straight line N in the row direction X by about several pixels to several hundred pixels in a case where the position of the straight line N in the row direction X is used as a reference or a position within a central division area in a case where the light receiving surface 50 is equally divided into n, n being an odd number of 3 or more, in the row direction X.

Hereinafter, modification examples of the imaging element 5 will be described.

First Modification Example

Figure 8:
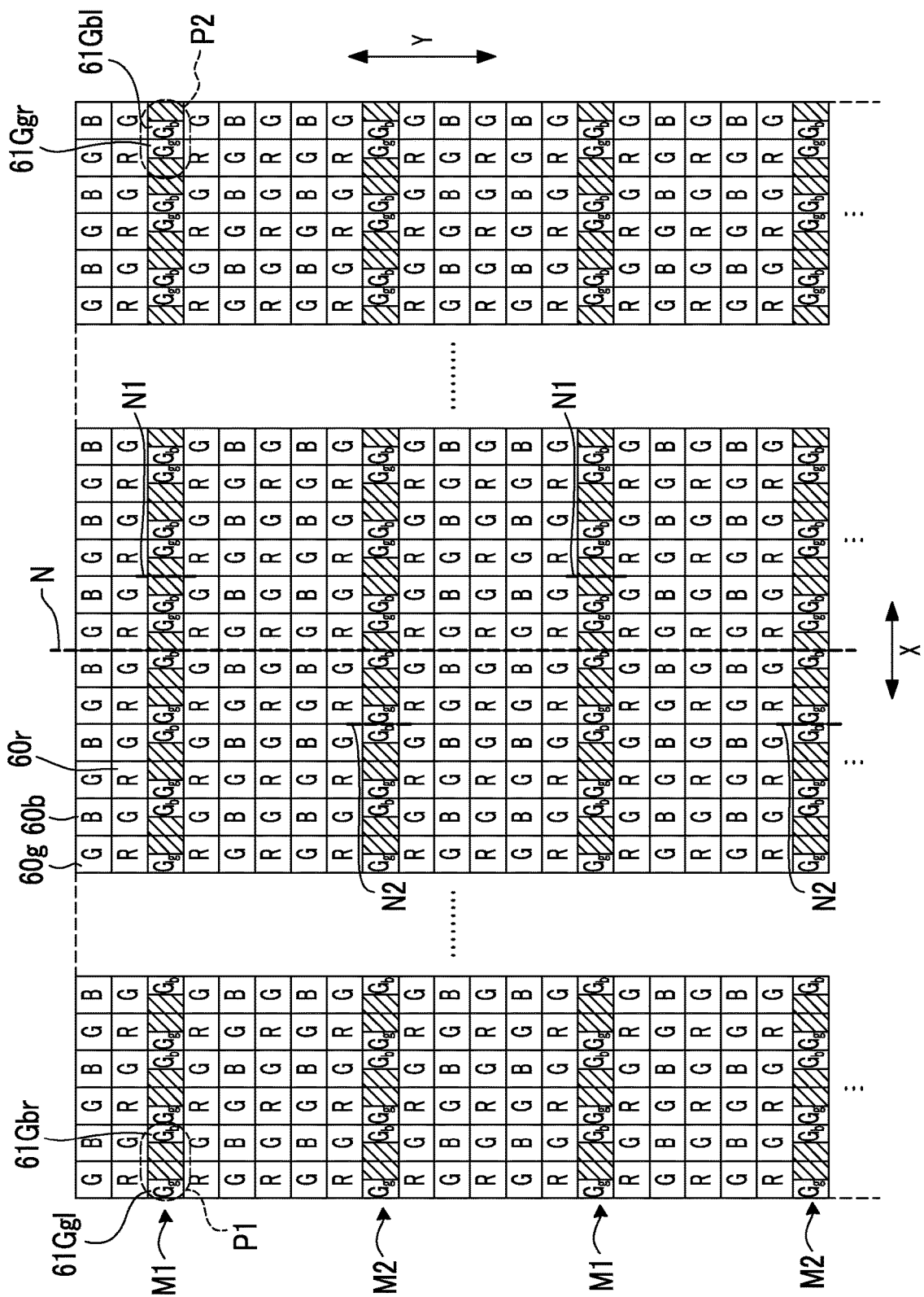
FIG. 8 is an enlarged schematic diagram showing a first modification example of the light receiving surface 50 shown in FIG. 2.

FIG. 8 is an enlarged schematic diagram showing a first modification example of the light receiving surface 50 shown in FIG. 2.

Phase-difference detecting pixel rows having two patterns such as first phase-difference detecting pixel rows M1 and second phase-difference detecting pixel rows M2 are formed in the imaging element 5 according to the first modification example shown in FIG. 8, instead of the phase-difference detecting pixel rows M. Other configurations are the same as those shown in FIG. 3.

In the first phase-difference detecting pixel row M1, a boundary between a portion in which the first pairs P1 are arranged and a portion in which the second pairs P2 are arranged is determined by a straight line N1 which is parallel to the straight line N and is present so as to be shifted from the straight line N in the right direction by two pixels.

In this example, a distance between the straight line N1 and the straight line N corresponds to two pixels, but this distance may be a distance corresponding to any number of pixels. The first phase-difference detecting pixel rows M1 constitute a first pair row.

In the second phase-difference detecting pixel row M2, a boundary between a portion in which the first pairs P1 are arranged and a portion in which the second pairs P2 are arranged is determined by a straight line N2 which is parallel to the straight line N and is present so as to be shifted from the straight line N in the left direction by two pixels.

In this example, a distance between the straight line N2 and the straight line N corresponds to two pixels, but this distance may be a distance corresponding to any number of pixels. The second phase-difference detecting pixel rows M2 constitute a second pair row.

A plurality of phase-difference detecting pixel rows including the first phase-difference detecting pixel rows M1 and the second phase-difference detecting pixel rows M2 is alternately arranged on the light receiving surface 50 of the imaging element 5 according to the first modification example with periodicity in the column direction Y.

As stated above, the imaging element 5 according to the first modification example is configured such that a position of the boundary between the portion in which the first pairs P1 are arranged and the portion in which the second pairs P2 are arranged includes the first phase-difference detecting pixel rows M1 and the second phase-difference detecting pixel rows M2 different from each other and the first phase-difference detecting pixel rows M1 and the second phase-difference detecting pixel rows M2 are periodically arranged in the column direction Y.

For example, in the configuration of the first modification example, at least of the straight line N1 or the straight line N2 is set in an area between each of the five phase-difference detecting areas 53 present in the center in the row direction X of FIG. 2 and the phase-difference detecting areas 53 horizontally adjacent thereto in the row direction X, and thus, at least one phase-difference detecting pixel row in which the boundary is present on the outside is included in each phase-difference detecting area 53 shown in FIG. 2.

As stated above, a portion of the phase-difference detecting pixel row which does not cross the boundary is necessarily present in each phase-difference detecting area 53, and thus, it is possible to more accurately calculate the phase difference of the subject image captured in each phase-difference detecting area 53. As a result, it is possible to improve the focusing accuracy of the digital camera.

As described above, the size of the phase-difference detecting area set in the light receiving surface 50 may be greater than that of the phase-difference detecting area 53 shown in FIG. 2.

Accordingly, it is preferable that at least one phase-difference detecting pixel row in which the boundary is present on the outside is included in each of all the settable phase-difference detecting areas with consideration for the maximum size and the minimum size of the phase-difference detecting area set in the light receiving surface 50.

Specifically, in the imaging element 5 shown in FIG. 8, the following Condition (1) and Condition (2) are satisfied, and thus, at least one phase-difference detecting pixel row in which the boundary is present on the outside is included in each of all the settable phase-difference detecting areas.

Condition (1)

A distance between the straight line N1 and the straight line N2 in the row direction X is greater than a width of the maximum size of the phase-difference detecting area in the row direction X.

Condition (2)

A distance between the first phase-difference detecting pixel row M1 and the second phase-difference detecting pixel row M2 adjacent thereto is less than a width of the minimum size of the phase-difference detecting area in the column direction Y.

The aforementioned conditions are satisfied, and thus, it is possible to calculate the phase difference of the subject image captured by the set phase-difference detecting area with high accuracy even though the phase-difference detecting area having any size is set. Accordingly, it is possible to improve the focusing accuracy.

According to the first modification example, since the first phase-difference detecting pixel rows M1 and the second phase-difference detecting pixel rows M2 are periodically arranged, it is possible to simplify an algorithm of the interpolation correction processing performed by the digital signal processing unit 17.

Second Modification Example

Figure 9:
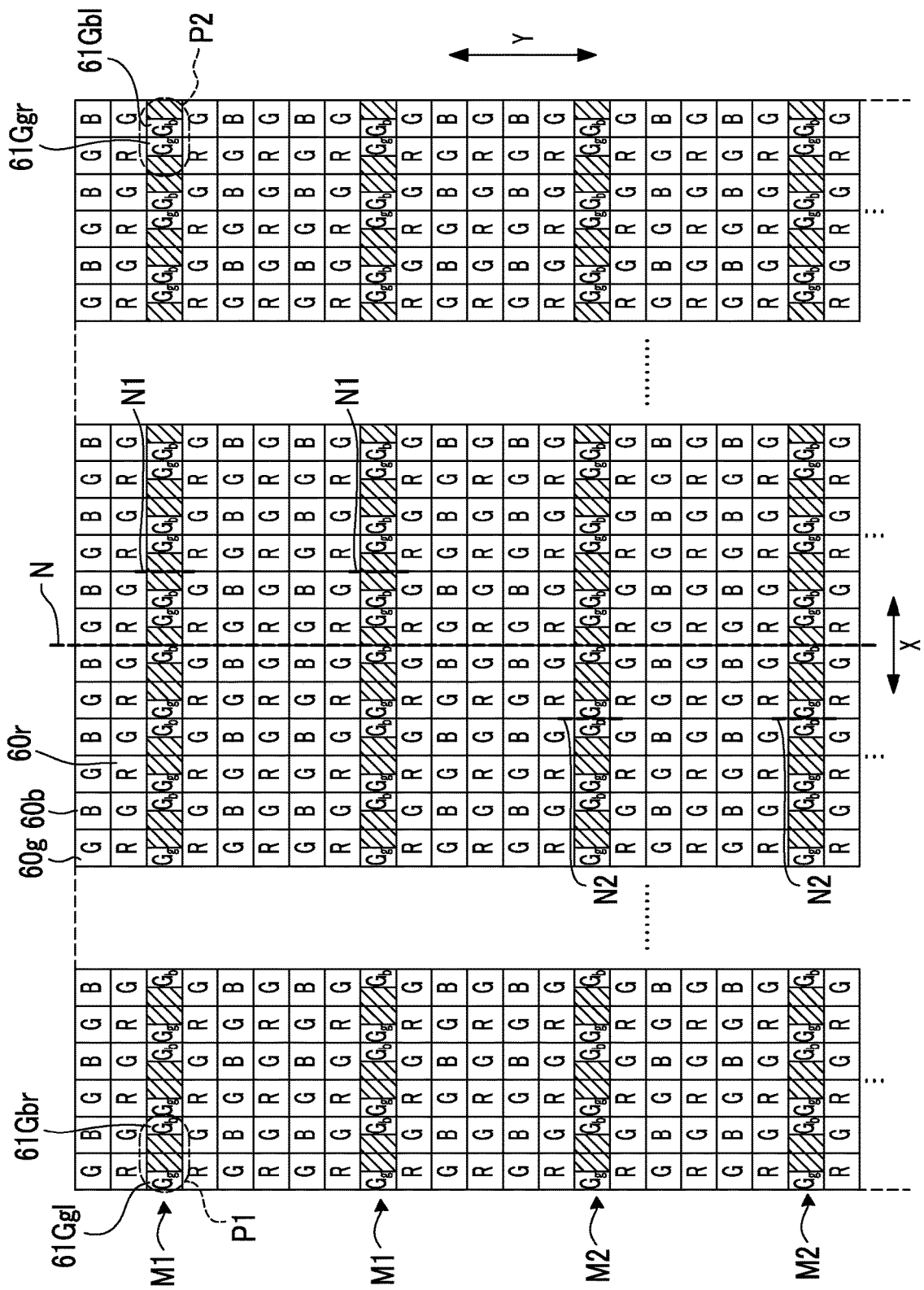
FIG. 9 is an enlarged schematic diagram showing a second modification example of the light receiving surface 50 shown in FIG. 2.

FIG. 9 is an enlarged schematic diagram showing a second modification example of the light receiving surface 50 shown in FIG. 2.

The imaging element 5 according to the second modification example shown in FIG. 9 is different from the imaging element 5 according to the first modification example in that the first phase-difference detecting pixel rows M1 and the second phase-difference detecting pixel rows M2 are alternately arranged with periodicity at an interval of N (in the example of FIG. 9, 2), N being a natural number of 2 or more, in the column direction Y. Other configurations are the same as those of the imaging element 5 according to the first modification example.

For example, in the configuration of the second modification example, at least of the straight line N1 or the straight line N2 is set in an area between each of the five phase-difference detecting areas 53 present in the center in the row direction X of FIG. 2 and the phase-difference detecting areas 53 horizontally adjacent thereto in the row direction X, and thus, at least one phase-difference detecting pixel row in which the boundary is present on the outside is included in each phase-difference detecting area 53 shown in FIG. 2.

As stated above, the phase-difference detecting pixel row which does not cross the boundary is necessarily present in each phase-difference detecting area 53, and thus, it is possible to more accurately calculate the phase difference of the subject image captured in each phase-difference detecting area 53. As a result, it is possible to improve the focusing accuracy of the digital camera.

Similarly to the first modification example, it is preferable that at least one phase-difference detecting pixel row in which the boundary is present on the outside is included in each of all the settable phase-difference detecting areas with consideration for the maximum size and the minimum size of the phase-difference detecting area set in the light receiving surface 50.

Specifically, in the imaging element 5 shown in FIG. 9, the following Condition (3) and Condition (4) are satisfied, and thus, at least one phase-difference detecting pixel row in which the boundary is present on the outside may be included in each of all the settable phase-difference detecting areas.

Condition (3)

A distance between the straight line N1 and the straight line N2 in the row direction X is greater than a width of the maximum size of the phase-difference detecting area in the row direction X.

Condition (4)

A value obtained by multiplying a distance between the phase-difference detecting pixel rows adjacent in the column direction Y by the N is less than a width of the minimum size of the phase-difference detecting area in the column direction Y.

The aforementioned conditions are satisfied, and thus, it is possible to calculate the phase difference of the subject image captured by the set phase-difference detecting area with high accuracy even though the phase-difference detecting area having any size is set. Accordingly, it is possible to improve the focusing accuracy.

According to the second modification example, another first phase-difference detecting pixel row M1 is necessarily present so as to be adjacent to the first phase-difference detecting pixel row M1 in the column direction Y, and another second phase-difference detecting pixel row M2 is necessarily present so as to be adjacent to the second phase-difference detecting pixel row M2 in the column direction Y.

Thus, in a case where any pixel of the first phase-difference detecting pixel row M1 or the second phase-difference detecting pixel row M2 is defective, it is possible to correct a defect in this pixel by using the output signal of the adjacent pixel having the same configuration as that of this pixel. Accordingly, it is possible to improve the accuracy of the defect correction in a case where there is the defective pixel.

According to the second modification example, since the first phase-difference detecting pixel rows M1 and the second phase-difference detecting pixel rows M2 are periodically arranged, it is possible to simplify the algorithm of the interpolation correction processing performed by the digital signal processing unit 17.

Third Modification Example

It has been described in the first modification example and the second modification example that the first phase-difference detecting pixel rows M1 and the second phase-difference detecting pixel rows M2 are periodically arranged in the column direction Y.

In this modification example, the first phase-difference detecting pixel rows M1 and the second phase-difference detecting pixel rows M2 may be randomly arranged in the column direction Y. In such a configuration, it is possible to improve the quality of the captured image.

Fourth Modification Example

The imaging element 5 may be configured such that three or more phase-difference detecting pixel rows in which positions of the boundaries are different are formed on the light receiving surface 50. In such a configuration, it is possible to improve the quality of the captured image.

In such a configuration, three or more phase-difference detecting pixel rows are periodically arranged in the column direction Y, and thus, it is possible to simplify the algorithm of the interpolation correction. The Conditions (1) and (2) or the Conditions (3) or (4) are satisfied, and thus, it is possible to improve the focusing accuracy.

Fifth Modification Example

Although the first pairs P1 and the second pairs P2 are constituted by the two phase-difference detecting pixels having the same position in the column direction Y, the first pairs P1 and the second pairs P2 may be constituted by two phase-difference detecting pixels having different positions in the column direction Y.

Figure 10:
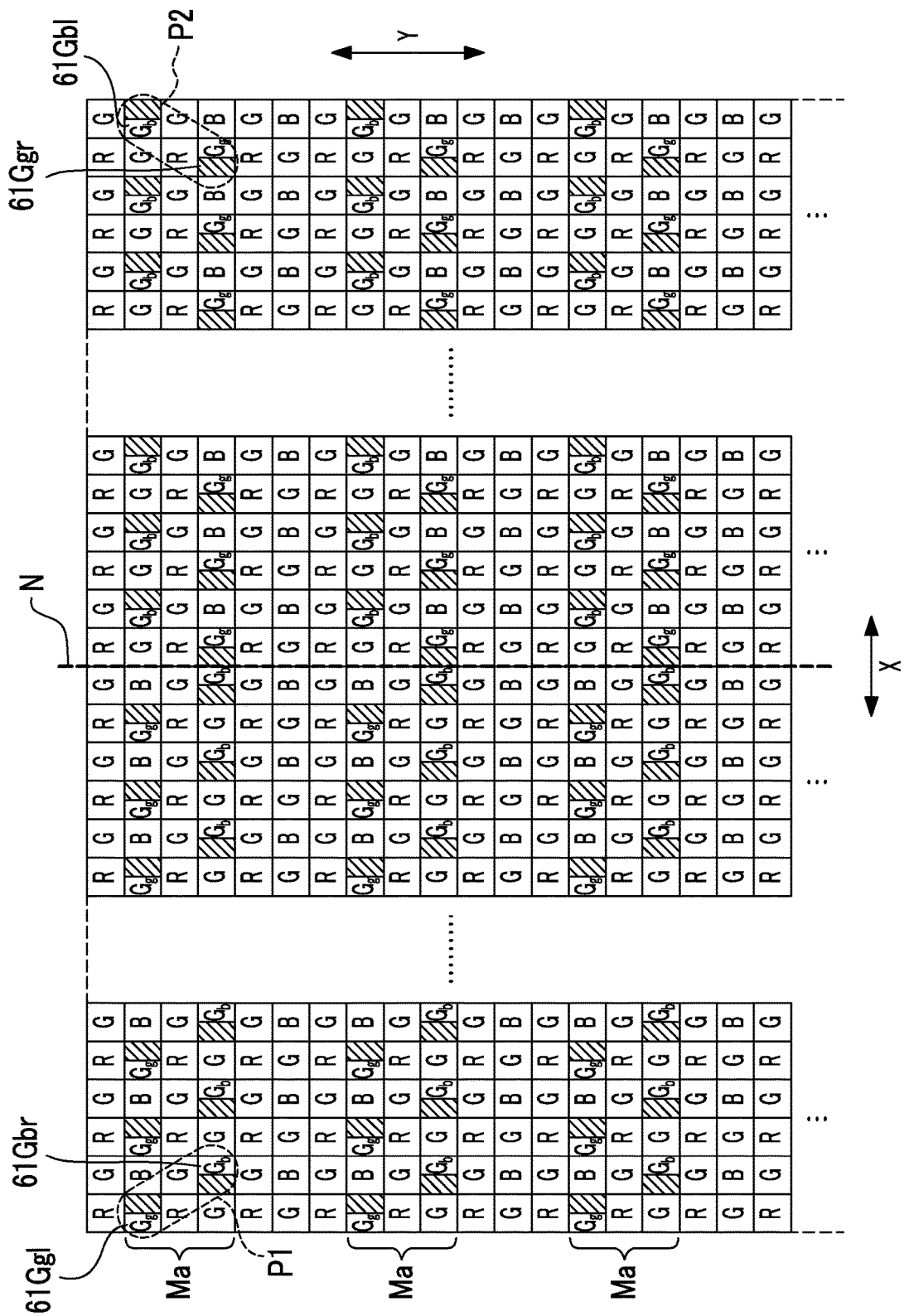
FIG. 10 is an enlarged schematic diagram showing a fifth modification example of the light receiving surface 50 shown in FIG. 2.

FIG. 10 is an enlarged schematic diagram showing a fifth modification example of the light receiving surface 50 shown in FIG. 2.

In the imaging element 5 shown in FIG. 10, on the left side of an upper pixel row of two GB pixel rows adjacent in the column direction Y from the straight line N, the left-eccentric phase-difference detecting pixels 61Ggl are arranged in the positions in which the imaging pixels 60g are arranged. On the right side of this pixel row from the straight line N, the left-eccentric phase-difference detecting pixels 61Gbl are arranged in the positions in which the imaging pixels 60b are arranged.

In the imaging element 5 shown in FIG. 10, on the left side of a lower pixel row of the two GB pixel rows from the straight line N, the right-eccentric phase-difference detecting pixels 61Gbr are arranged in the positions in which the imaging pixels 60b are arranged. On the right side of the pixel row from the straight line N, the right-eccentric phase-difference detecting pixels 61Ggr are arranged in the positions in which the imaging pixels 60g are arranged.

In the imaging element 5 shown in FIG. 10, the left-eccentric phase-difference detecting pixel 61Ggl present on the left side from the straight line N and the right-eccentric phase-difference detecting pixel 61Gbr which is closest to the left-eccentric phase-difference detecting pixel 61Gbl and is diagonally present on the right side in a lower direction constitute the first pair P1.

In the imaging element 5 shown in FIG. 10, the right-eccentric phase-difference detecting pixel 61Ggr present on the right side from the straight line N and the left-eccentric phase-difference detecting pixel 61Gbl which is closest to this right-eccentric phase-difference detecting pixel 61Ggr and is diagonally present on the right side in an upper direction constitute the second pair P2.

Phase-difference detecting pixel rows Ma are constituted by a plurality of first pairs P1 arranged in the row direction X and a plurality of second pairs P2 arranged in the row direction X.

In the configuration shown in FIG. 10, it is possible to obtain the same advantage as that of the imaging element 5 shown in FIG. 3. The configurations described in the first modification example to the fifth modification example may be applied to the configuration shown in FIG. 10.

Sixth Modification Example

The imaging element 5 may be configured such that a plurality of pixels is arranged according to a pattern other than the Bayer array.

Figure 11:
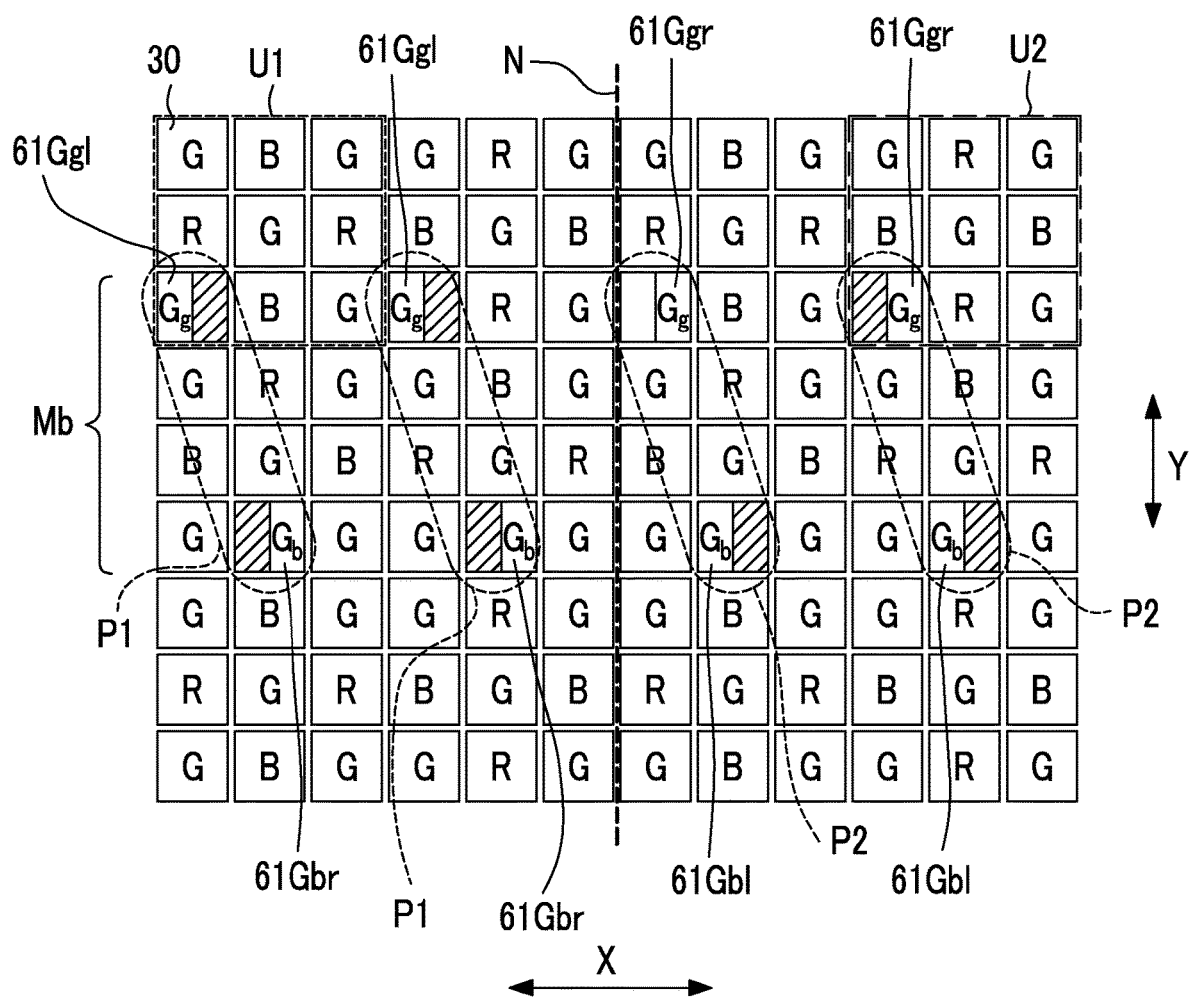
FIG. 11 is an enlarged schematic diagram showing a sixth modification example of the light receiving surface 50 shown in FIG. 2.

FIG. 11 is an enlarged schematic diagram showing a sixth modification example of the light receiving surface 50 shown in FIG. 2.

The pixels of the imaging element 5 shown in FIG. 11 are arranged according to a pattern in which a ratio between the number of pixels that photoelectrically convert the R light rays, the number of pixels that photoelectrically convert the B light rays, and the number of pixels that photoelectrically convert the G light rays is 1:1:2.5.

Figure 12:
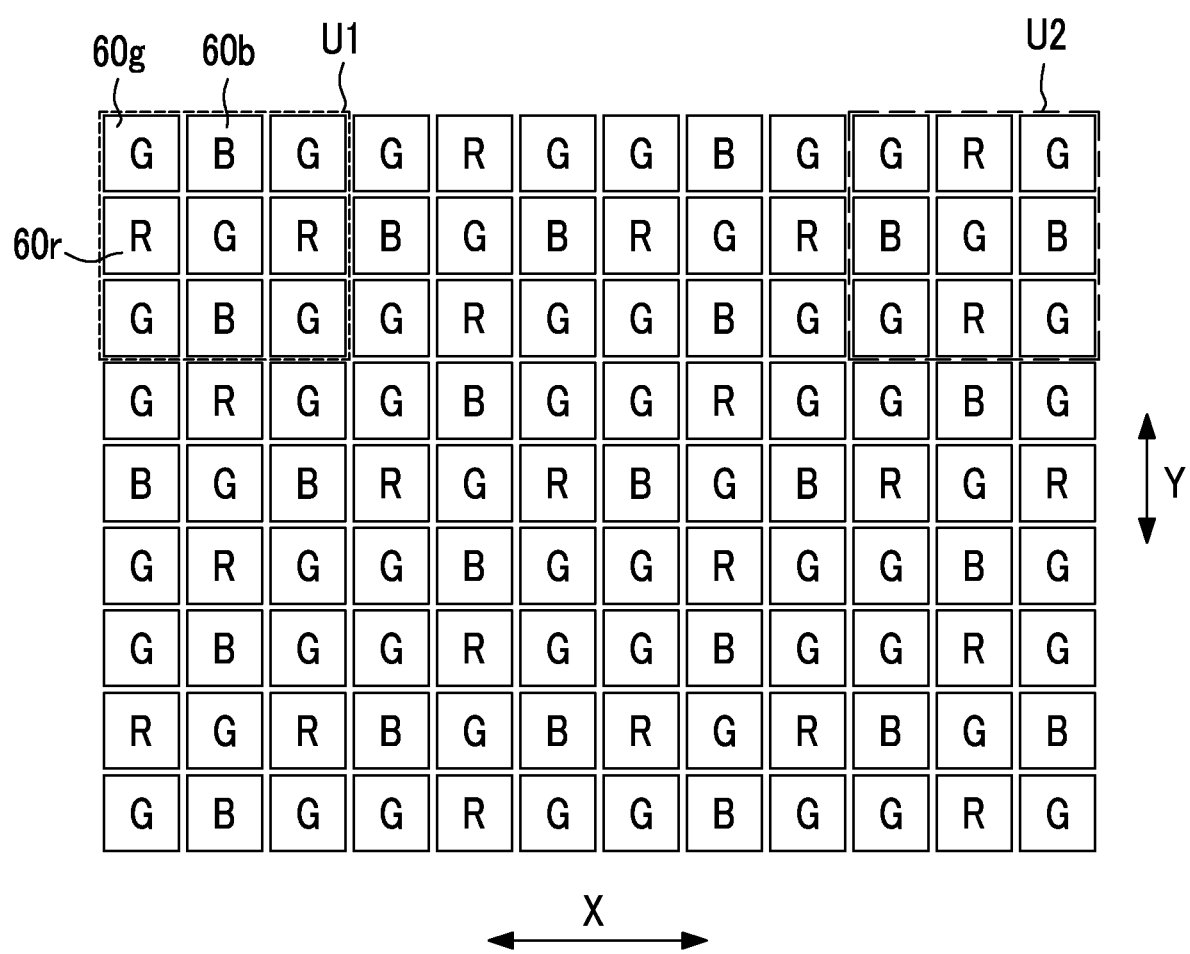
FIG. 12 is a schematic diagram showing a pixel arrangement pattern of the imaging element.

As shown in FIG. 12, this pattern is a pattern in which a unit U1 that includes the imaging pixels 60r, 60g, and 60b and a unit U2 that replaces the positions of the imaging pixels 60r and the imaging pixels 60b in the unit U1 are arranged on a pane.

In the unit U1, the imaging pixels 60g are arranged in four corners and the center. In the unit U1, the imaging pixels 60r are arranged so as to be adjacent to the imaging pixel 60g present in the center in the row direction X, and the imaging pixels 60b are arranged so as to be adjacent to the imaging pixel 60g present in the center in the column direction Y. The configuration and advantage of the pixel arrangement shown in FIG. 12 are described in detail in WO13/168493A, and thus, the description thereof will be omitted.

The imaging element 5 according to the sixth modification example shown in FIG. 11 is configured such that the left-eccentric phase-difference detecting pixels 61Ggl are arranged in some of the positions in which the imaging pixels 60g present on the left side from the straight line N are arranged and the right-eccentric phase-difference detecting pixels 61Ggr are arranged in some of the positions in which the imaging pixels 60g present on the right side from the straight line N are arranged in the pixel arrangement shown in FIG. 12.

The imaging element 5 shown in FIG. 11 is configured such that the right-eccentric phase-difference detecting pixels 61Gbr are arranged in some of the positions in which the imaging pixels 60b and 60r present on the left side from the straight line N are arranged and the left-eccentric phase-difference detecting pixels 61Gbl are arranged in some of the positions in which the imaging pixels 60b and 60r present on the right side from the straight line N are arranged in the pixel arrangement shown in FIG. 12.

In the imaging element 5 shown in FIG. 11, a first pair P1 is constituted by the left-eccentric phase-difference detecting pixel 61Ggl and the right-eccentric phase-difference detecting pixel 61Gbr diagonally present on the right side in the lower direction.

A second pair P2 is constituted by the right-eccentric phase-difference detecting pixel 61Ggr and the left-eccentric phase-difference detecting pixel 61Gbl diagonally present on the right side in the lower direction.

Phase-difference detecting pixel rows Mb are constituted by a plurality of first pairs P1 and a plurality of second pairs P2.

According to the imaging element 5 shown in FIG. 11, it is possible to obtain the same advantage as that of the imaging element 5 shown in FIG. 3. The configurations described in the first modification example to the fourth modification example may be applied to the configuration shown in FIG. 11.

Hereinafter, a configuration of a smartphone as the imaging device will be described.

Figure 13:
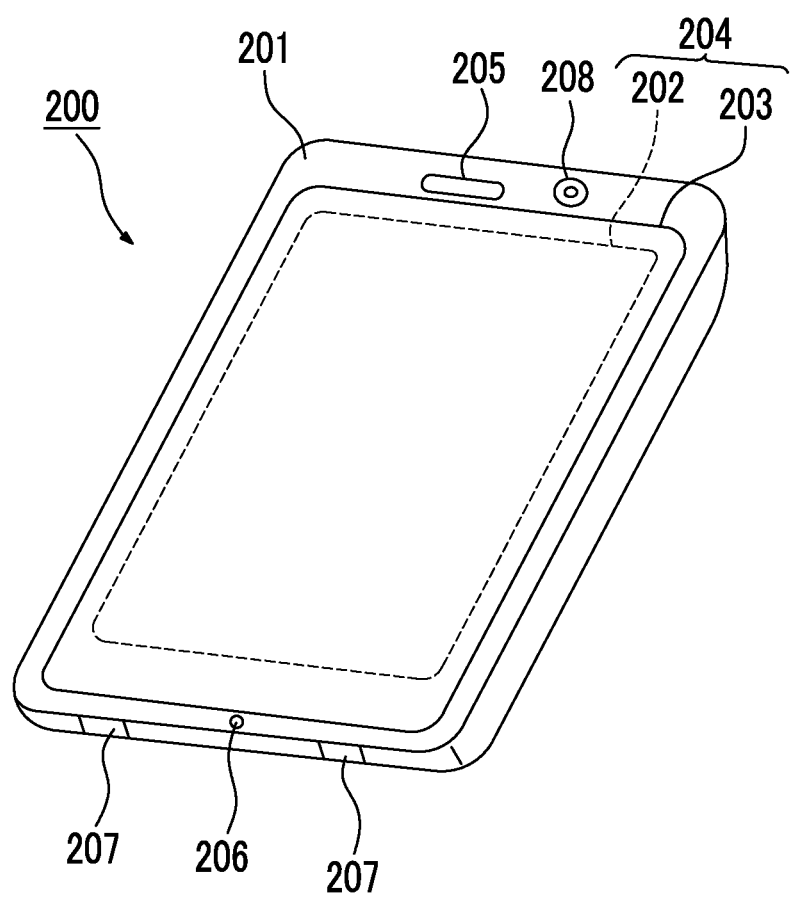
FIG. 13 shows an external appearance of a smartphone which is an embodiment of the imaging device.

FIG. 13 shows an external appearance of a smartphone 200 which is an embodiment of the imaging device according to the present invention.

The smartphone 200 shown in FIG. 13 has a flat casing 201, and comprises a display input unit 204 in which a display panel 202 as a display unit and a manipulation panel 203 as an input unit are integrally formed on one surface of the casing 201.

Such a casing 201 comprises a speaker 205, a microphone 206, a manipulation unit 207, and a camera unit 208.

The configuration of the casing 201 is not limited thereto. For example, the display unit and the input unit may be independent of each other, or may have a folding structure or a slide mechanism.

Figure 14:
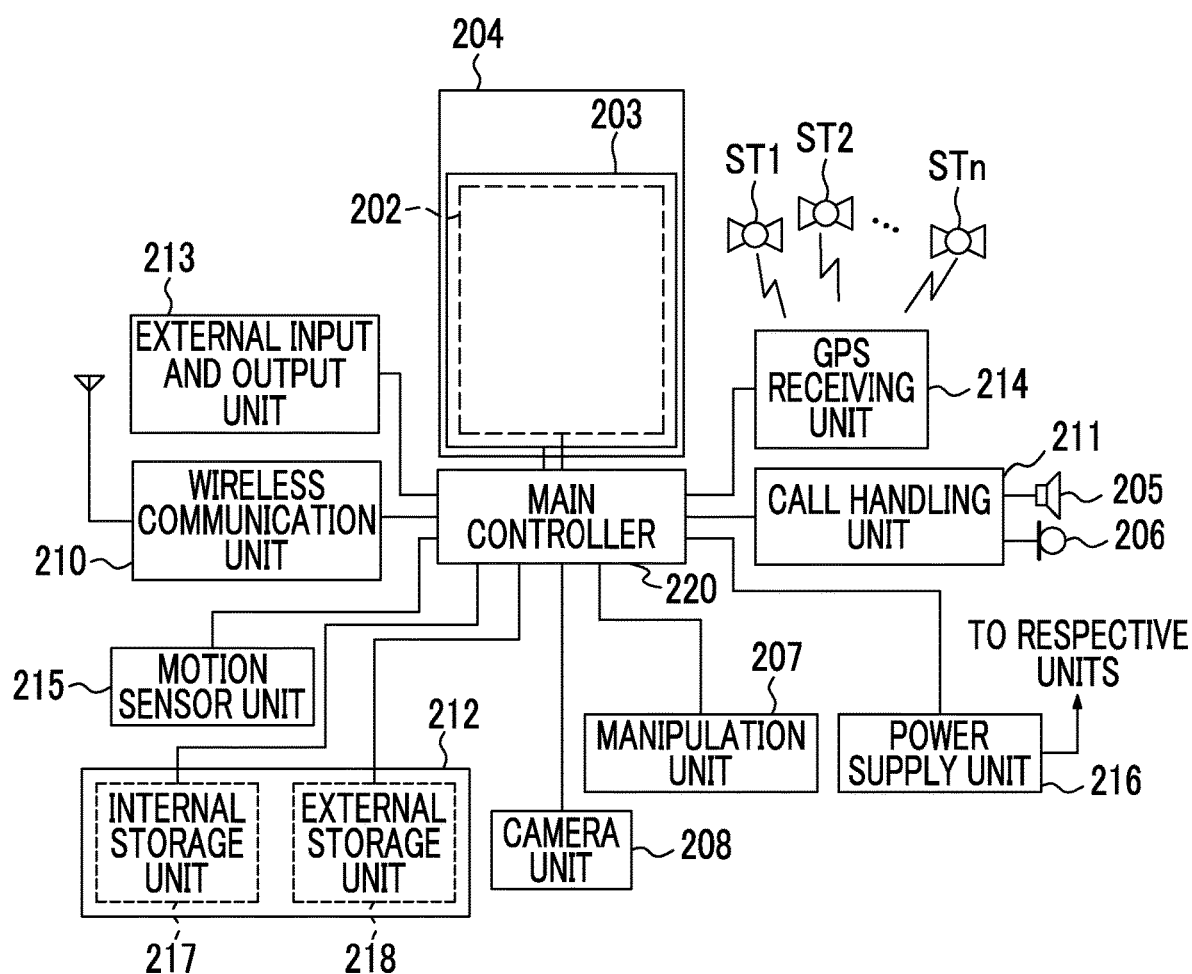
FIG. 14 is a block diagram showing a configuration of the smartphone shown in FIG. 13.

FIG. 14 is a block diagram showing the configuration of the smartphone 200 shown in FIG. 13.

As shown in FIG. 14, principal components of the smartphone comprise a wireless communication unit 210, a display input unit 204, a call handling unit 211, a manipulation unit 207, a camera unit 208, a storage unit 212, an external input and output unit 213, a Global Positioning System (GPS) receiving unit 214, a motion sensor unit 215, a power supply unit 216, and a main controller 220.

Principal functions of the smartphone 200 comprise a wireless communication function of performing mobile wireless communication through a base station device BS (not shown) and a mobile communication network NW (not shown).

The wireless communication unit 210 performs wireless communication with a base station device BS in the mobile communication network NW according to a command of the main controller 220. With the use of the wireless communication, the transmission and reception of various kinds of file data, such as voice data and image data, and electronic mail data, or the reception of Web data and streaming data are performed.

The display input unit 204 is a so-called touch panel which displays images (still images and moving images) or character information to visually transfer information to the user and detects a user's manipulation on the displayed information under the control of the main controller 220, and comprises the display panel 202 and the manipulation panel 203.

The display panel 202 uses a liquid crystal display (LCD) or an organic electro-luminescence display (OELD) as a display device.

The manipulation panel 203 is a device which is placed such that an image displayed on a display surface of the display panel 202 is visible, and detects one or a plurality of coordinates of a manipulation with a user's finger or a stylus. In a case where the device is manipulated with the user's finger or the stylus, a detection signal due to the manipulation is output to the main controller 220. Next, the main controller 220 detects a manipulation position (coordinates) on the display panel 202 based on the received detection signal.

As shown in FIG. 13, although the display panel 202 and the manipulation panel 203 of the smartphone 200 illustrated as an embodiment of an imaging device of the present invention are integrated to constitute the display input unit 204, the manipulation panel 203 is arranged to completely cover the display panel 202.

In a case where this arrangement is employed, the manipulation panel 203 may have a function of detecting a user's manipulation even in an area outside the display panel 202. In other words, the manipulation panel 203 may comprise a detection area (hereinafter, referred to as a display area) for an overlapped portion which overlaps the display panel 202 and a detection area (hereinafter, referred to as a non-display area) for an outer edge portion which does not overlap the display panel 202 other than the display area.

Although the size of the display area may completely match the size of the display panel 202, it is not necessary to match both of the size of the display area and the size of the display panel. The manipulation panel 203 may comprise two sensitive areas including an outer edge portion and an inner portion other than the outer edge portion.

The width of the outer edge portion is appropriately designed according to the size of the casing 201 or the like. As a position detection system which is employed in the manipulation panel 203, a matrix switching system, a resistive film system, a surface acoustic wave system, an infrared system, an electromagnetic induction system, an electrostatic capacitance system, and the like are exemplified, and any system can be employed.

The call handling unit 211 comprises the speaker 205 and the microphone 206, converts voice of the user input through the microphone 206 to voice data processable in the main controller 220 and outputs voice data to the main controller 220, or decodes voice data received by the wireless communication unit 210 or the external input and output unit 213 and outputs voice from the speaker 205.

As shown in FIG. 13, for example, the speaker 205 can be mounted on the same surface as the surface on which the display input unit 204 is provided, and the microphone 206 can be mounted on the side surface of the casing 201.

The manipulation unit 207 is a hardware key using a key switch or the like, and receives a command from the user. For example, as shown in FIG. 13, the manipulation unit 207 is a push button-type switch which is mounted on the side surface of the casing 201 of the smartphone 200, and is turned on by being depressed with a finger or the like and is turned off by restoration force of the panel or the like in a case where the finger is released.

The storage unit 212 stores a control program or control data of the main controller 220, application software, address data in association with the name, telephone number, and the like of a communication partner, data of transmitted and received electronic mail, Web data downloaded by Web browsing, and downloaded content data, and temporarily stores streaming data or the like.

The storage unit 212 is constituted by an internal storage unit 217 embedded in the smartphone and an external storage unit 218 having a slot for a detachable external memory. The internal storage unit 217 and the external storage unit 218 constituting the storage unit 212 are realized using a memory (for example, a microSD (Registered Trademark) memory or the like), such as a flash memory type, a hard disk type, a multimedia card micro type, or a card type, or a storage medium, such as a random access memory (RAM) or a read only memory (ROM).

The external input and output unit 213 plays a role of an interface with all external devices connected to the smartphone 200, and is provided for direct or indirect connection to other external devices through communication or the like (for example, universal serial bus (USB), IEEE 1394, or the like), or a network (for example, the Internet, wireless LAN, Bluetooth (Registered trademark), radio frequency identification (RFID), infrared communication (Infrared Data Association: IrDA) (Registered Trademark), Ultra Wideband (UWB) (Registered Trademark), ZigBee (Registered Trademark), or the like).

The external devices connected to the smartphone 200 are, for example, a wired or wireless headset, a wired or wireless external charger, a wired or wireless data port, a memory card connected through a card socket, a subscriber identity module (SIM) card, a user identity module (UIM) card, an external audio-video device connected through an audio-video input and output (I/O) terminal, an external audio-video device connected in a wireless manner, a smartphone connected in a wired or wireless manner, a personal computer connected in a wired or wireless manner, a PDA connected in a wired or wireless manner, an earphone connected in a wired or wireless manner, and the like. The external input and output unit 213 can transfer data transmitted from the external devices to the respective components in the smartphone 200 or can transmit data in the smartphone 200 to the external devices.

The GPS receiving unit 214 receives GPS signals transmitted from GPS satellites ST1 to STn according to a command of the main controller 220, executes positioning calculation processing based on a plurality of received GPS signals, and detects the position of the smartphone 200 having latitude, longitude, and altitude. In a case where positional information can be acquired from the wireless communication unit 210 or the external input and output unit 213 (for example, a wireless LAN), the GPS receiving unit 214 can detect the position using the positional information.

The motion sensor unit 215 comprises, for example, a three-axis acceleration sensor or the like, and detects physical motion of the smartphone 200 according to a command of the main controller 220. The moving direction or acceleration of the smartphone 200 is detected by detecting physical motion of the smartphone 200. The detection result is output to the main controller 220.

The power supply unit 216 supplies electric power stored in a battery (not shown) to the respective units of the smartphone 200 according to a command of the main controller 220.

The main controller 220 comprises a microprocessor, operates according to the control program or control data stored in the storage unit 212, and integrally controls the respective units of the smartphone 200. The main controller 220 has a mobile communication control function of controlling respective units of a communication system in order to perform voice communication or data communication through the wireless communication unit 210, and an application processing function.

The application processing function is realized by the main controller 220 operating according to application software stored in the storage unit 212. The application processing function is, for example, an infrared communication function of controlling the external input and output unit 213 to perform data communication with a device facing the smartphone 200, an electronic mail function of transmitting and receiving electronic mail, a Web browsing function of browsing Web pages, or the like.

The main controller 220 has an image processing function of displaying video on the display input unit 204, or the like based on image data (still image or moving image data), such as received data or downloaded streaming data. The image processing function refers to a function of the main controller 220 decoding image data, performing image processing on the decoding result, and displaying an image on the display input unit 204.

The main controller 220 executes display control on the display panel 202 and manipulation detection control for detecting a user's manipulation through the manipulation unit 207 and the manipulation panel 203. With the execution of the display control, the main controller 220 displays an icon for activating application software or a software key, such as a scroll bar, or displays a window for creating electronic mail.

The scroll bar refers to a software key for receiving a command to move a display portion of an image which is too large to fit into the display area of the display panel 202.

With the execution of the manipulation detection control, the main controller 220 detects a user's manipulation through the manipulation unit 207, receives a manipulation on the icon or an input of a character string in an entry column of the window through the manipulation panel 203, or receives a scroll request of a display image through the scroll bar.

In addition, with the execution of the manipulation detection control, the main controller 220 has a touch panel control function of determining whether a manipulation position on the manipulation panel 203 is the superimposed portion (display area) overlapping the display panel 202 or the outer edge portion (non-display area) not overlapping the display panel 202 other than the display area, and controlling the sensitive area of the manipulation panel 203 or the display position of the software key.

The main controller 220 may detect a gesture manipulation on the manipulation panel 203 and may execute a function set in advance according to the detected gesture manipulation. The gesture manipulation is not a conventional simple touch manipulation, but means a manipulation to render a track with a finger or the like, a manipulation to simultaneously designate a plurality of positions, or a manipulation to render a track for at least one of a plurality of positions by combining the above-described manipulations.

The camera unit 208 includes the configuration other than the external memory controller 20, the recording medium 21, the display controller 22, the display unit 23, and the manipulation unit 14 in the digital camera shown in FIG. 1. Captured image data generated by the camera unit 208 can be recorded in the storage unit 212 or can be output through the external input and output unit 213 or the wireless communication unit 210.

In the smartphone 200 shown in FIG. 13, although the camera unit 208 is mounted on the same surface as the display input unit 204, the mounting position of the camera unit 208 is not limited thereto, and the camera unit 208 may be mounted on the rear surface of the display input unit 204.

The camera unit 208 can be used for various functions of the smartphone 200. For example, an image acquired by the camera unit 208 can be displayed on the display panel 202, or an image in the camera unit 208 can be used as one manipulation input of the manipulation panel 203.

In a case where the GPS receiving unit 214 detects the position, the position may be detected with reference to an image from the camera unit 208. In addition, the optical axis direction of the camera unit 208 of the smartphone 200 can be determined or a current use environment may be determined with reference to an image from the camera unit 208 without using the three-axis acceleration sensor or in combination with the three-axis acceleration sensor. Of course, an image from the camera unit 208 may be used in application software.

In addition, image data of a still image or a moving image may be attached with positional information acquired by the GPS receiving unit 214, voice information (which may be converted to text information through voice-text conversion by the main controller or the like) acquired by the microphone 206, posture information acquired by the motion sensor unit 215, or the like and can be recorded in the storage unit 212, or may be output through the external input and output unit 213 or the wireless communication unit 210.

In the smartphone 200 having the aforementioned configuration, it is possible to perform high-quality imaging through the aforementioned processing using the digital signal processing unit 17 shown in FIG. 1 or 5.

The present invention may be applied to an imaging element which includes white pixels (for example, pixels without color filters) that photoelectrically convert white light rays in addition to the pixels that output the R signals, the pixels that output the G signals, and the pixels that output the B signals in the imaging element 5 according to the aforementioned embodiment and modification examples.

In this case, a phase-difference detecting pixel is disposed between a position in which the white pixel is disposed and a position in which the pixel that outputs the R signal or the pixel that outputs the B signal is disposed.

Although it has been described in the imaging element 5 according to the aforementioned embodiment and modification examples that three color light rays are separated and are photoelectrically converted, the present invention may be applied to a case where the number of colors capable of being separated is two colors including a color having the largest degree of contribution to the brightness signals.

In the imaging element 5 according to the aforementioned embodiment and modification examples, the colors of the light rays which are photoelectrically converted by the left-eccentric phase-difference detecting pixels 61Ggl, the right-eccentric phase-difference detecting pixels 61Ggr, the left-eccentric phase-difference detecting pixels 61Gbl, and the right-eccentric phase-difference detecting pixels 61Gbr are determined depending on the degrees of contribution of the colors to the brightness signals.

For example, in a case where the imaging element 5 is used as an endoscope, it is considered that the brightness signals are generated by maximizing the proportion of the R signals among the R signals, the G signals, and the B signals generated so as to correspond to the pixels.

In this case, the left-eccentric phase-difference detecting pixels 61Ggl, the right-eccentric phase-difference detecting pixels 61Ggr, the left-eccentric phase-difference detecting pixels 61Gbl, and the right-eccentric phase-difference detecting pixels 61Gbr are the pixels that photoelectrically convert the R light rays.

The left-eccentric phase-difference detecting pixels 61Ggl are arranged in some of the positions in which the imaging pixels 60r present on the left side from the straight line N or the straight line N1 or N2 are arranged, and the right-eccentric phase-difference detecting pixels 61Ggr are arranged in some of the positions in which the imaging pixels 60r present on the right side from the straight line N or the straight line N1 or N2 are arranged.

The right-eccentric phase-difference detecting pixels 61Gbr are arranged in some of the positions in which the imaging pixels 60g or the imaging pixels 60b present on the left side from the straight line N or the straight line N1 or N2 are arranged, and the left-eccentric phase-difference detecting pixels 61Gbl are arranged in some of the positions in which the imaging pixels 60g or the imaging pixels 60b on the right side from the straight line N or the straight line N1 or N2 are arranged.

With such a configuration, since the R signals having the largest degree of contribution to the brightness signals among the output signals of the phase-difference detecting pixels are returned to the level available as the pixel signals through the gain correction, it is possible to improve the quality of the captured image.

Although it has been described in the aforementioned embodiment and modification examples that the phase difference is detected in the row direction X, the present invention may be similarly applied to a case where the phase difference is detected in the column direction Y.

As described above, the following matters are disclosed in this specification.

(1) There is provided an imaging element that has a plurality of pixels which photoelectrically converts light rays having different colors, and has a light receiving surface on which the plurality of pixels is arranged in two dimensions according to a regular pattern. The plurality of pixels includes first pixels that output signals each having first color components which most contribute to obtainment of brightness signals, and second pixels that output signals having color components other than the first color component, the first pixels include a first imaging pixel having a photoelectric conversion area in a reference position, a first phase-difference detecting pixel having a photoelectric conversion area in a position eccentric to one side in a predetermined direction with respect to the reference position, and a second phase-difference detecting pixel having a photoelectric conversion area in a position eccentric to the other side in the predetermined direction with respect to the reference position, each of the second pixels is a second imaging pixel having a photoelectric conversion area in the reference position, a pair row constituted by pairs, which include a plurality of first pairs of the first phase-difference detecting pixels arranged in arrangement positions of the first pixels based on the pattern and the second phase-difference detecting pixels arranged in arrangement positions of the second pixels based on the pattern and a plurality of second pairs of the second phase-difference detecting pixels arranged in the arrangement positions of the first pixels based on the pattern and the first phase-difference detecting pixels arranged in the arrangement positions of the second pixels based on the pattern and are arranged in the predetermined direction, is formed on the light receiving surface, the plurality of first pairs included in the pair row is arranged so as to be closer to the one side from a predetermined position in the predetermined direction of the pair row, and the plurality of second pairs included in the pair row is arranged so as to be closer to the other side from the predetermined position in the predetermined direction of the pair row.

(2) In the imaging element according to (1), a plurality of the pair rows arranged in a perpendicular direction perpendicular to the predetermined direction is formed on the light receiving surface, and the plurality of pair rows includes pair rows having a plurality of patterns in which the predetermined positions in the predetermined direction are different.

(3) In the imaging element according to (2), the plurality of pair rows includes first pair rows and second pair rows in which the predetermined positions in the predetermined direction are different, and the first pair rows and the second pair rows are periodically arranged in the perpendicular direction.

(4) In the imaging element according to (3), the first pair rows and the second pair rows are alternately arranged in the perpendicular direction.

(5) In the imaging element according to (3), the first pair rows and the second pair rows are alternately arranged at an interval of N pairs, N being a natural number of 2 or more, in the perpendicular direction.

(6) In the imaging element according to any one of (2) to (5), ranges corresponding to a subject to be in focus are settable in the light receiving surface, and at least one pair row in which the predetermined position is present outside the ranges is included in each of all the settable ranges.

(7) In the imaging element according to any one of (1) to (6), the first pixels photoelectrically convert green light rays, and the second pixels photoelectrically convert blue light rays.

(8) In the imaging element according to (1), the predetermined position is set near a straight line which passes through an intersection of an optical axis of an imaging optical system including a focus lens disposed in front of the light receiving surface of the imaging element and the light receiving surface and extends in a perpendicular direction perpendicular to the predetermined direction.

(9) There is provided an imaging device comprising the imaging element according to any one of (1) to (8), and an image processing unit that generates captured image data based on signals output from the plurality of pixels of the imaging element.

(10) In the imaging device according to (9), the image processing unit comprises a correction unit that generates pixel signals corresponding to positions of the first phase-difference detecting pixels by multiplying output signals of the first phase-difference detecting pixels arranged in the arrangement positions of the first pixels based on the pattern by a gain, generates pixel signals corresponding to positions of the second phase-difference detecting pixels by multiplying output signals of the second phase-difference detecting pixels arranged in the arrangement positions of the first pixels based on the pattern by a gain, generates pixel signals corresponding to positions of the first phase-difference detecting pixels arranged in the arrangement positions of the second pixels based on the pattern through interpolation based on output signals of the second imaging pixels present near the first phase-difference detecting pixels, and generates pixel signals corresponding to positions of the second phase-difference detecting pixels arranged in the arrangement positions of the second pixels based on the pattern through the interpolation based on output signals of the second imaging pixels present near the second phase-difference detecting pixels, and a captured image data generating unit that generates the captured image data constituted by brightness signals and color difference signals based on output signals of the first imaging pixels, the output signals of the second imaging pixels, and the pixel signals generated by the correction unit.

(11) There is provided an imaging device comprising the imaging element according to any one of (1) to (8), and a processor that generates captured image data based on signals output from the plurality of pixels of the imaging element.

(12) In the imaging device according to (11), the processor generates pixel signals corresponding to positions of the first phase-difference detecting pixels by multiplying output signals of the first phase-difference detecting pixels arranged in the arrangement positions of the first pixels based on the pattern by a gain, generates pixel signals corresponding to positions of the second phase-difference detecting pixels by multiplying output signals of the second phase-difference detecting pixels arranged in the arrangement positions of the first pixels based on the pattern by a gain, generates pixel signals corresponding to positions of the first phase-difference detecting pixels arranged in the arrangement positions of the second pixels based on the pattern through interpolation based on output signals of the second imaging pixels present near the first phase-difference detecting pixels, generates pixel signals corresponding to positions of the second phase-difference detecting pixels arranged in the arrangement positions of the second pixels based on the pattern through the interpolation based on output signals of the second imaging pixels present near the second phase-difference detecting pixels, and generates the captured image data constituted by brightness signals and color difference signals based on output signals of the first imaging pixels, the output signals of the second imaging pixels, and the pixel signals generated by the correction unit.

According to the present invention, it is possible to provide an imaging element capable of improving the quality of a captured image by employing gain correction as a method of correcting output signals of phase-difference detecting pixels having the largest degree of contribution to brightness signals, and an imaging device comprising the imaging element.

Although the present invention has been described in conjunction with a specific embodiment, the present invention is not limited to the embodiment, and may be variously changed without departing from the technical spirit of the invention disclosed herein.

This application is based on Japanese Patent Application (2016-110393), filed Jun. 1, 2016, the content of which is incorporated herein.

EXPLANATION OF REFERENCES

1: imaging lens
2: stop

5: imaging element
6: analog signal processing unit
7: analog-to-digital conversion circuit
8: lens drive unit
9: stop drive unit
10: imaging element drive unit
11: system controller
14: manipulation unit
15: memory controller
16: main memory
17: digital signal processing unit
171: gain correction processing unit
172: interpolation correction processing unit
173: captured image data generating unit
19: focus detection unit
20: external memory controller
21: recording medium
22: display controller
23: display unit
24: control bus
25: data bus
50: light receiving surface
53: phase-difference detecting area
60r, 60g, 60b: imaging pixel
61Ggr, 60Gbr: right-eccentric phase-difference detecting pixel
61Ggl, 60Gbl: left-eccentric phase-difference detecting pixel
63: light shielding film
63a, 63b, 63c: opening
64, 64b, 64c: photoelectric conversion area
P1: first pair
P2: second pair
M, Ma, Mb: phase-difference detecting pixel row
M1: first phase-difference detecting pixel row
M2: second phase-difference detecting pixel row
N, N1, N2: straight line
X: row direction
Y: column direction
U1, U2: unit
200: smartphone
201: casing
202: display panel
203: manipulation panel
204: display input unit
205: speaker
206: microphone
207: manipulation unit
208: camera unit
210: wireless communication unit
211: call handling unit
212: storage unit
213: external input and output unit
214: GPS receiving unit
215: motion sensor unit
216: power supply unit
217: internal storage unit
218: external storage unit
220: main controller
ST1 to STn: GPS satellite

What is claimed is:

1. An imaging element that has a plurality of pixels which photoelectrically converts light rays having different colors, and has a light receiving surface on which the plurality of pixels is arranged in two dimensions according to a regular pattern,
wherein the plurality of pixels comprises first pixels that output signals each having a first color component which most contribute to obtainment of brightness signals, and second pixels that output signals having color components other than the first color component,
the first pixels comprise a first imaging pixel having a photoelectric conversion area in a reference position, a first phase-difference detecting pixel having a photoelectric conversion area in a position eccentric to one side in a predetermined direction with respect to the reference position, and a second phase-difference detecting pixel having a photoelectric conversion area in a position eccentric to other side in the predetermined direction with respect to the reference position,
each of the second pixels is a second imaging pixel having a photoelectric conversion area in the reference position,
a pair row constituted by pairs, which comprise a plurality of first pairs of the first phase-difference detecting pixels arranged in arrangement positions of the first pixels based on the pattern and the second phase-difference detecting pixels arranged in arrangement positions of the second pixels based on the pattern and a plurality of second pairs of the second phase-difference detecting pixels arranged in the arrangement positions of the first pixels based on the pattern and the first phase-difference detecting pixels arranged in the arrangement positions of the second pixels based on the pattern and are arranged in the predetermined direction, is formed on the light receiving surface,
the plurality of first pairs included in the pair row is arranged so as to be closer to the one side from a predetermined position in the predetermined direction of the pair row, and
the plurality of second pairs included in the pair row is arranged so as to be closer to the other side from the predetermined position in the predetermined direction of the pair row.

2. The imaging element according to claim 1,
wherein a plurality of the pair rows arranged in a perpendicular direction perpendicular to the predetermined direction is formed on the light receiving surface, and
the plurality of pair rows comprises pair rows having a plurality of patterns in which the predetermined positions in the predetermined direction are different.

3. The imaging element according to claim 2,
wherein the plurality of pair rows comprises first pair rows and second pair rows in which the predetermined positions in the predetermined direction are different, and the first pair rows and the second pair rows are periodically arranged in the perpendicular direction.

4. The imaging element according to claim 3,
wherein the first pair rows and the second pair rows are alternately arranged in the perpendicular direction.

5. The imaging element according to claim 3,
wherein the first pair rows and the second pair rows are alternately arranged at an interval of N pairs, N being a natural number of 2 or more, in the perpendicular direction.

6. The imaging element according to claim 2,
wherein ranges corresponding to a subject to be in focus are settable in the light receiving surface, and at least one of the pair rows in which the predetermined position is present outside the ranges is included in each of all the settable ranges.

7. The imaging element according to claim 3,
wherein ranges corresponding to a subject to be in focus are settable in the light receiving surface, and at least one of the pair rows in which the predetermined position is present outside the ranges is included in each of all the settable ranges.

8. The imaging element according to claim 4,
wherein ranges corresponding to a subject to be in focus are settable in the light receiving surface, and at least one of the pair rows in which the predetermined position is present outside the ranges is included in each of all the settable ranges.

9. The imaging element according to claim 5,
wherein ranges corresponding to a subject to be in focus are settable in the light receiving surface, and at least one of the pair rows in which the predetermined position is present outside the ranges is included in each of all the settable ranges.

10. The imaging element according to claim 1,
wherein the first pixels photoelectrically convert green light rays, and
the second pixels photoelectrically convert blue light rays.

11. The imaging element according to claim 2,
wherein the first pixels photoelectrically convert green light rays, and
the second pixels photoelectrically convert blue light rays.

12. The imaging element according to claim 3,
wherein the first pixels photoelectrically convert green light rays, and
the second pixels photoelectrically convert blue light rays.

13. The imaging element according to claim 4,
wherein the first pixels photoelectrically convert green light rays, and
the second pixels photoelectrically convert blue light rays.

14. The imaging element according to claim 5,
wherein the first pixels photoelectrically convert green light rays, and
the second pixels photoelectrically convert blue light rays.

15. The imaging element according to claim 6,
wherein the first pixels photoelectrically convert green light rays, and
the second pixels photoelectrically convert blue light rays.

16. The imaging element according to claim 7,
wherein the first pixels photoelectrically convert green light rays, and
the second pixels photoelectrically convert blue light rays.

17. The imaging element according to claim 1,
wherein the predetermined position is set near a straight line which passes through an intersection of an optical axis of an imaging optical system including a focus lens disposed in front of the light receiving surface of the imaging element and the light receiving surface and extends in a perpendicular direction perpendicular to the predetermined direction.

18. An imaging device comprising:
the imaging element according to claim 1; and
an image processing unit that generates captured image data based on signals output from the plurality of pixels of the imaging element.

19. The imaging device according to claim 18,
wherein the image processing unit comprises
a correction unit that generates pixel signals corresponding to positions of the first phase-difference detecting pixels by multiplying output signals of the first phase-difference detecting pixels arranged in the arrangement positions of the first pixels based on the pattern by a gain, generates pixel signals corresponding to positions of the second phase-difference detecting pixels by multiplying output signals of the second phase-difference detecting pixels arranged in the arrangement positions of the first pixels based on the pattern by a gain, generates pixel signals corresponding to positions of the first phase-difference detecting pixels arranged in the arrangement positions of the second pixels based on the pattern through interpolation based on output signals of the second imaging pixels present near the first phase-difference detecting pixels, and generates pixel signals corresponding to positions of the second phase-difference detecting pixels arranged in the arrangement positions of the second pixels based on the pattern through interpolation based on output signals of the second imaging pixels present near the second phase-difference detecting pixels, and
a captured image data generating unit that generates the captured image data constituted by brightness signals and color difference signals based on output signals of the first imaging pixels, output signals of the second imaging pixels, and the pixel signals generated by the correction unit.

* * * * *